United States Patent
He et al.

(10) Patent No.: US 12,353,291 B2
(45) Date of Patent: Jul. 8, 2025

(54) OBTAINING FULL SNAPSHOTS FOR SUBSETS OF OBJECTS OVER TIME

(71) Applicant: Rubrik, Inc., Palo Alto, CA (US)

(72) Inventors: Haitao He, Redmond, WA (US); Rohit Agrawal, Santa Clara, CA (US); Sujeet Gholap, Sunnyvale, CA (US); Amelia Vu, Mountain View, CA (US); Ningshan Li, Cupertino, CA (US); Richard Yuh, Mountain View, CA (US); Ramya Thulasingam, Fremont, CA (US)

(73) Assignee: Rubrik, Inc., Palo Alto, CA (US)

( * ) Notice: Subject to any disclaimer, the term of this patent is extended or adjusted under 35 U.S.C. 154(b) by 24 days.

(21) Appl. No.: 18/085,559

(22) Filed: Dec. 20, 2022

(65) Prior Publication Data

US 2024/0202076 A1    Jun. 20, 2024

(51) Int. Cl.
*G06F 11/14* (2006.01)

(52) U.S. Cl.
CPC ...... *G06F 11/1451* (2013.01); *G06F 2201/84* (2013.01)

(58) Field of Classification Search
CPC .......................... G06F 11/1451; G06F 2201/84
See application file for complete search history.

(56) References Cited

U.S. PATENT DOCUMENTS

| | | | |
|---|---|---|---|
| 2013/0290265 A1* | 10/2013 | Hari | G06F 16/113 707/654 |
| 2017/0168903 A1* | 6/2017 | Dornemann | G06F 11/2038 707/645 |
| 2018/0173784 A1* | 6/2018 | Mandic | G06F 16/27 707/645 |
| 2019/0227878 A1* | 7/2019 | Agarwal | G06F 8/658 707/737 |
| 2020/0241756 A1* | 7/2020 | Lee | G06F 3/065 707/737 |
| 2020/0293408 A1* | 9/2020 | Mutha | G06F 11/1451 707/737 |
| 2023/0195578 A1* | 6/2023 | Lee | G06F 11/1451 707/645 |

\* cited by examiner

*Primary Examiner* — Yuk Ting Choi
(74) *Attorney, Agent, or Firm* — Holland & Hart LLP

(57) ABSTRACT

A data management system (DMS) may use a staggered full snapshot rollout approach to obtain full snapshots of multiple computing objects. The DMS may identify that a quantity of the multiple objects scheduled for full backups by the DMS exceeds a threshold quantity. The DMS may initiate, at a first time, and based on the quantity of objects exceeding the threshold quantity, a first set of full snapshots corresponding to a first subset of objects included in the multiple objects. The DMS may initiate, at a second time subsequent to the first time, a second set of full snapshots corresponding to a second subset of objects included in the multiple objects. The second subset of objects may be different than the first subset of objects. The DMS may continue to obtain full snapshots of respective subsets of the multiple objects until all of the scheduled full snapshots are obtained.

20 Claims, 11 Drawing Sheets

OBTAINING FULL SNAPSHOTS FOR SUBSETS OF OBJECTS OVER TIME

FIELD OF TECHNOLOGY

The present disclosure relates generally to database systems and data processing, and more specifically to obtaining full snapshots for subsets of objects over time.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

Figure 1:
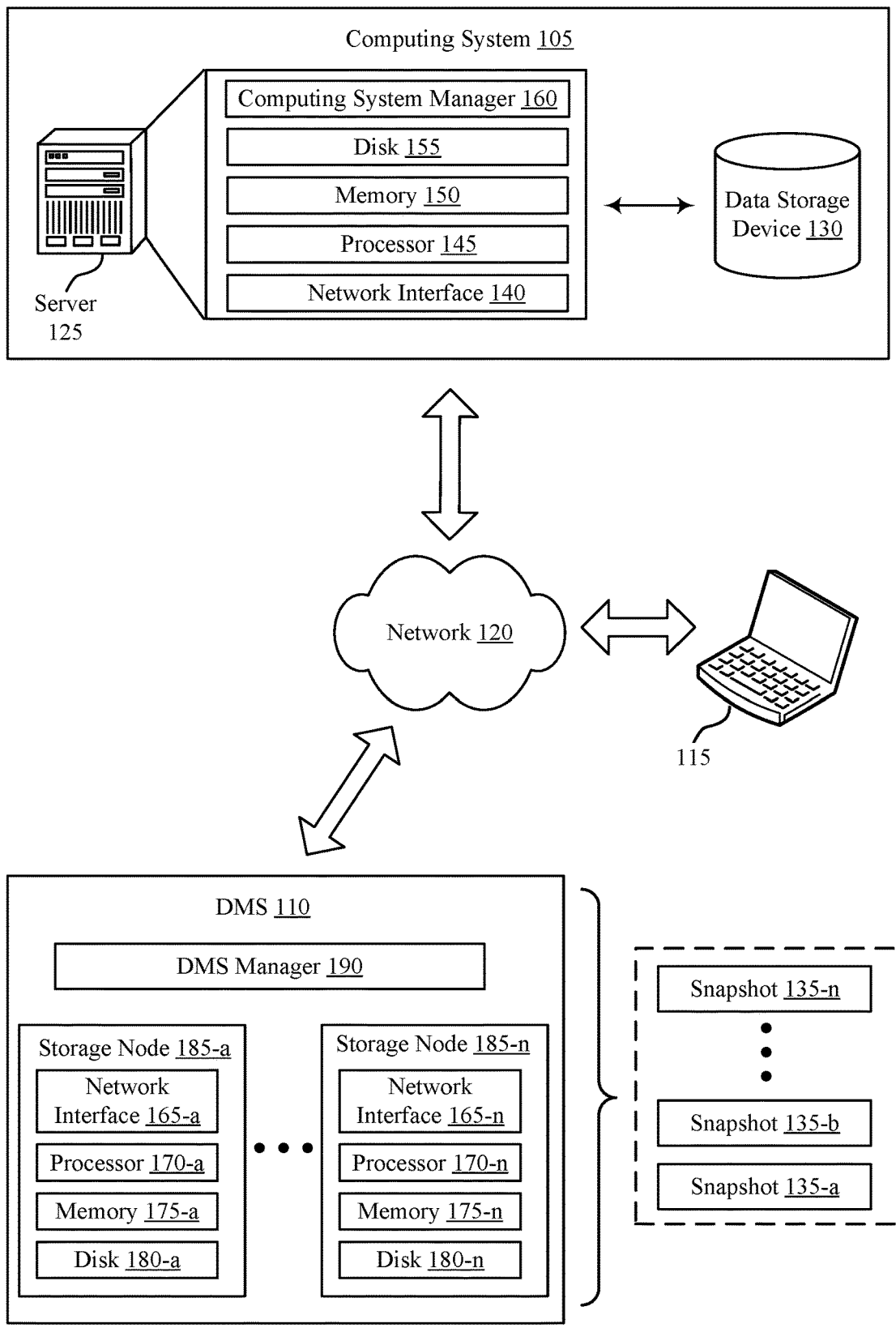
FIG. 1 illustrates an example of a computing environment that supports obtaining full snapshots for subsets of objects over time in accordance with aspects of the present disclosure.

A data management service (DMS) may obtain and store snapshots of computing objects (e.g., computing resources) for one or more clients. The computing objects may be, for example, mailboxes (e.g., in the example of Microsoft 365), virtual machines (VMs), folders, or other types of computing resources. To maintain up-to-date backups of the computing objects, the DMS may obtain full snapshots of each object followed by one or more incremental snapshots that represent changes to the object since the full snapshot was obtained. In some examples, the DMS may be scheduled to obtain a relatively large quantity of full snapshots—that is, full snapshots of multiple different computing objects. For example, the DMS may be scheduled to obtain new full snapshots for each of a relatively large set of objects when the DMS switches from using a first storage engine for backups to a second storage engine for backups (e.g., when beginning to use a new engine) because the snapshot formats of the first and second storage engines may not be compatible, so prior full snapshots obtained using the first storage engine may not be compatible with incremental snapshots obtained using the second storage engine. Such large-scale full backup operations may be relatively complex and may, in some examples, negatively impact performance of the DMS if initiated at a single time.

Techniques, systems, and devices described herein provide a staggered or phased full snapshot rollout approach for obtaining a relatively large quantity of full snapshots with reduced complexity and improved DMS performance. To perform the staggered or phased full snapshot rollout approach described herein, the DMS may initiate the acquisition of full snapshots for a first batch of objects at a first time, followed by initiating acquisition of full snapshots for a second batch of objects at a second time, and so on, instead of attempting to initiate the acquisition of full snapshots for all of the objects at the same time (which may lead to compliance issues as obtaining such a large quantity of full snapshots at the same time may lead to the system being busy for an unacceptable duration of time). The DMS may initiate acquisition of full snapshots of a subset of the set of objects per some defined time period (e.g., per day or per any other defined time period). A quantity of objects included in a given subset may be based on a percentage of full backups that may be obtained by the DMS per time period while performance of the applications and systems that use the objects is maintained. The selection of specific objects to include in a given subset may be performed autonomously based on unique identifiers (IDs) of the objects. For example, a first range of values of unique IDs may be enabled for backups at a first time, and a second range of values of unique IDs may be enabled for backups at a second time, and so on. A size of an initial subset of objects may be selected by an administrator or client.

The DMS, the administrator, or both may adjust the percentages of objects that may be backed up per day based on a status of previously obtained and currently pending backups being obtained by the DMS, based on an average size of objects for a given client being relatively large or relatively small, or both. The DMS may thereby utilize a staggered and adjustable approach to divide a quantity of objects into subsets and obtain full backups of the subsets of objects over time, which may provide for the DMS to obtain full backups of a relatively large quantity of objects while maintaining compliance and reliability for backing up client data.

Aspects of the disclosure are initially described in the context of a computing environment supporting an on-demand database service. Additional aspects of the disclosure are described with reference to computing environments and flow diagrams. Aspects of the disclosure are further illustrated by and described with reference to flow diagrams, apparatus diagrams, system diagrams, and flowcharts that relate to obtaining full snapshots for subsets of objects over time.

FIG. 1 illustrates an example of a computing environment 100 that supports obtaining full snapshots for subsets of objects over time in accordance with various aspects of the present disclosure. The computing environment 100 may include a computing system 105, a DMS 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally, or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a VM). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more VMs, the resources of which are made available to one or more client devices over a network (e.g., to one or more computing devices 115 over the network 120).

In some examples, the computing system 105 or aspects thereof may implement or be implemented by one or more VMs. The one or more VMs may run various applications, such as a database server, an application server, or a web server. For example, a server 125 may be used to host (e.g., create, manage) one or more VMs, and the computing system manager 160 may manage a virtualized infrastructure within the computing system 105 and perform management operations associated with the virtualized infrastructure. The computing system manager 160 may manage the provisioning of VMs running within the virtualized infrastructure and provide an interface to a computing device 115 interacting with the virtualized infrastructure. For example, the computing system manager 160 may be or include a hypervisor and may perform various VM-related tasks, such as cloning VMs, creating new VMs, monitoring the state of VMs, moving VMs between physical hosts for load balancing purposes, and facilitating backups of VMs. In some examples, the VMs, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170 (e.g., processors 170-a through 170-n), memories 175 (e.g., memories 175-a through 175-n), and disks 180 (e.g., disks 180-a through 180-n). The network interfaces 165 (e.g., network interfaces 165-a through 165-n) may enable the storage nodes 185 (e.g., storage nodes 185-a through 185-n) to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105 (e.g., snapshots 135-a, 135-b, through 135-n). A snapshot 135 of a computing object (e.g., a VM, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, VMs, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally, or alternatively, snapshots 135 may be stored in some other location connected with the network 120. For example, the DMS 110 may store more recent snapshots 135 at the storage nodes 185, and the DMS 110 may transfer less recent snapshots 135 via the network 120) to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally, or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. A base snapshot 135 may also be referred to as a full snapshot. An incremental snapshot 135 may represent the changes to the state—which may be referred to as the delta of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally, or alternatively, the DMS 110 may detect whether aspects of the computing system 105 have been impacted by malware (e.g., ransomware). Additionally, or alternatively, the DMS 110 may relocate data or create copies of data based on using one or more snapshots 135 to restore the associated computing object within its original location or at a new location (e.g., a new location within a different computing system 105). Additionally, or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely impacting other aspects of the performance of the computing system 105.

In some examples, the DMS 110 may obtain and store snapshots of computing objects (e.g., computing resources) for one or more clients. The computing objects may be, for example, mailboxes (e.g., in the example of Microsoft 365), VMs, folders, or other types of computing resources. To maintain up-to-date backups of the computing objects, the DMS may obtain full snapshots 135 of each object followed by one or more incremental snapshots 135 that represent changes to the object since a corresponding full snapshot 135 of the object was obtained. In some examples, the DMS 110 may be scheduled to obtain a relatively large quantity of full snapshots 135—that is, full snapshots 135 of multiple different computing objects. Such large-scale full backup operations may be relatively complex and may, in some examples, negatively impact performance of the DMS 110 if initiated at a single time.

Techniques, systems, and devices described herein provide a staggered or phased full snapshot rollout approach for obtaining a relatively large quantity of full snapshots 135 with reduced complexity and improved performance by the DMS 110 and applications or systems that use the objects. To perform the staggered or phased full snapshot rollout approach described herein, the DMS 110 may initiate acquisition of full snapshots 135 for a first batch of objects, followed by initiating acquisition of full snapshots 135 for a second batch of objects, and so on, instead of attempting to initiate acquisition of full snapshots 135 for all of the objects at the same time (which may lead to compliance issues as obtaining such a large quantity of full snapshots 135 at the same time may lead to the system being busy for an unacceptable duration of time). The DMS 110 may initiate acquisition of full snapshots 135 of a subset of the set of objects per some defined time period (e.g., per day or per any other defined time period). A quantity of objects included in a given subset may be based on a percentage of full backups that may be obtained by the DMS 110 per time period while performance of the applications and systems that use the objects is maintained. The selection of specific objects to include in a given subset may be performed autonomously based on unique IDs of the objects. For example, a first range of values of unique IDs may be enabled for backups at a first time, and a second range of values of unique IDs may be enabled for backups at a second time, and so on. A size of an initial subset of objects may be selected by an administrator or client via a user interface (e.g., via the computing device 115).

The DMS 110, the administrator, or both may adjust the percentages of objects that may be backed up per day based on a status of previously obtained and currently pending backups being obtained by the DMS 110, based on an average size of objects for a given client being relatively large or relatively small, or both. The DMS 110 may thereby utilize a staggered and adjustable approach to divide a quantity of objects into subsets and obtain full backups of the subsets of objects over time, which may provide for the DMS 110 to obtain full backups of a relatively large quantity of objects while maintaining compliance and reliability for backing up client data.

One or more aspects of the disclosure may be implemented in a computing environment 100 to additionally, or alternatively, solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
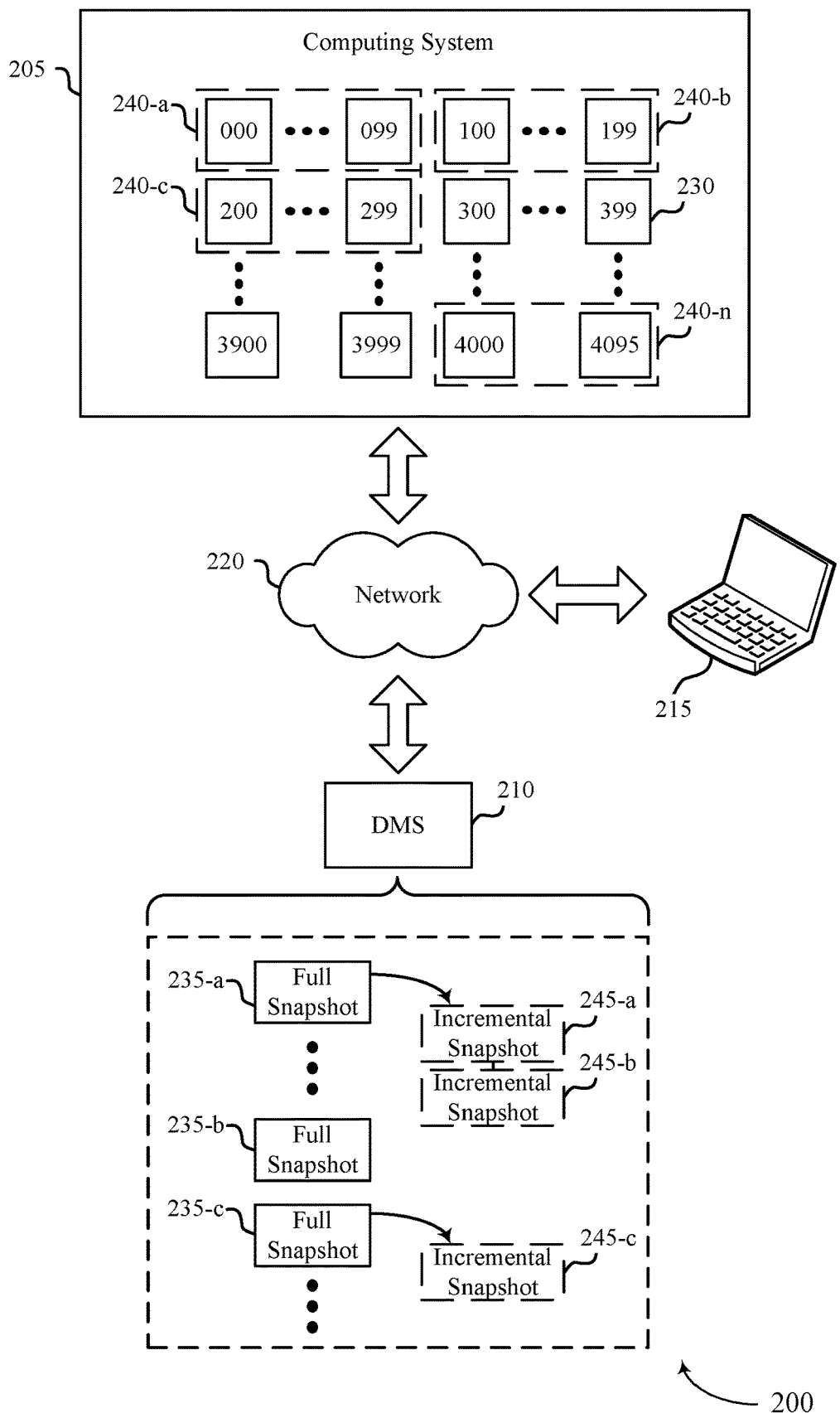
FIG. 2 illustrates an example of a computing environment that supports obtaining full snapshots for subsets of objects over time in accordance with aspects of the present disclosure.

FIG. 2 illustrates an example of a computing environment 200 that supports obtaining full snapshots for subsets of objects over time in accordance with aspects of the present disclosure. The computing environment 200 may implement or be implemented by aspects of the computing environment 100 described with reference to FIG. 1. For example, the computing environment 200 includes a computing system 205, a DMS 210, and a computing device 215, which may be in communication with one another via a network 220, as described with reference to FIG. 1. The DMS 210 may provide a data backup service for enterprise data associated with the computing system 205. In some aspects, the DMS 210 may utilize a staggered or phased full snapshot rollout approach to obtain full snapshots 235 of multiple objects 230 (e.g., computing resources) in the computing system 205.

The DMS 210 may manage enterprise data for one or more clients. The enterprise data may be stored in computing resources within one or more computing systems 205. In some examples, the enterprise data may be stored in the form of objects 230, which may represent examples of computing resources (e.g., VMs), or pieces of data, such as a fileset, a photo, a video, a mailbox, other types of data, or any combination thereof. Although a single computing system 205 is illustrated in FIG. 2, it is to be understood that the objects 230 managed by the DMS 210 may be distributed across one or more computing systems 205, one or more storage locations (e.g., servers, databases, or the like), or any combination thereof. For example, the DMS 210 may backup objects 230 for multiple different clients. In some examples, each client may host or be associated with a respective computing system 205 including enterprise data and computing resources, such as the objects 230, for that client. Additionally, or alternatively, one or more computing systems 205 may be shared by one or more clients.

The DMS 210 may, in some examples, store different types of snapshots for each object 230. For example, when the DMS 210 initiates a backup of an object 230, the DMS 210 may obtain a full snapshot 235 (also referred to as a base snapshot) of the object 230. The full snapshot 235 may represent the entirety of the state of the corresponding object 230 as of a point in time corresponding to the full snapshot 235. Once the DMS 210 obtains and stores a full snapshot 235 of a given object 230, the DMS 210 may subsequently obtain and store one or more incremental snapshots 245 of the object 230. The incremental snapshots 245 may represent the changes to the state—which may be referred to as the delta—of the corresponding object 230) that have occurred between an earlier or later point in time corresponding to another snapshot, such as the full snapshot 235 for the object 230 or another previously obtained incremental snapshot 245 of the object 230. In some examples, a full snapshot 235 may take more time and consume more power to obtain and store than an incremental snapshot 245.

The full snapshots 235 illustrated in FIG. 2 may represent examples of full snapshot 235 of respective objects 230. For example, the full snapshot 235-*a* may be a full snapshot 235-*a* of a first object 230 in the computing system 205. The corresponding incremental snapshot 245-*a* may represent changes to the state of the first object 230 that have occurred between a first time at which the full snapshot 235-*a* was obtained and a second time at which the incremental snapshot 245-*a* is obtained. The incremental snapshot 245-*b* may similarly represent changes to the state of the first object 230 since the second time at which the incremental snapshot 245-*a* was obtained. The full snapshot 235-*b* may be a full snapshot of a second object 230) from the computing system 205. In some aspects, the DMS 210 may not obtain an incremental snapshot 245 for the second object 230 due to there being no changes to the state of the second object since a first time at which the full snapshot 235-*b* was obtained. The full snapshot 235-*c* may be a full snapshot of a third object 230 from the computing system 205 and the incremental snapshot 245-*c* may represent changes to the state of the third object 230 since the full snapshot 235-*c* was obtained. It is to be understood that the full and incremental snapshots illustrated in FIG. 2 are examples, and any quantity of full or incremental snapshots may be obtained and stored by the DMS 210 for any quantity of objects 230.

The DMS 210 may identify multiple objects 230 for which the DMS 210 is to obtain full snapshots 235. That is, the DMS 210 may determine a quantity of objects 230 the DMS 210 is to start backing up. In some cases, the DMS 210 may identify a relatively large quantity of objects 230 of which the DMS 210 is scheduled to obtain full snapshots 235 within a given time period. Such large-scale full backup operations by the DMS 210 may be relatively complex and may be associated with reduced performance of the DMS 210 if initiated at a single time. For example, if a quantity of the objects 230 for which the DMS 210 is scheduled to obtain full snapshots 235 is relatively high, the DMS 210 may, in some cases, be unable to obtain full snapshots 235 of all of the objects at a same time or within a single time period without reducing data management performance and reliability. Such backup operations may occur, for example, when the DMS 210 switches storage engines used by the DMS 210, or in some other example scenarios, as described in further detail elsewhere herein, including with reference to FIG. 3.

In some examples, the DMS 210 may use a metadata table, such as an account settings table (AST) to select which objects 230 to initiate full snapshots 235 for. However, if the quantity of objects 230 for which full snapshots 235 are to be obtained is relatively high, a quantity of entries in the metadata table may be relatively high, which may increase complexity and reduce storage space. Thus, using an AST or other similar metadata table to track and select objects 230 for full snapshots 235 may be inefficient.

Techniques, systems, and devices described herein provide for the DMS 210 to utilize an automatic and phased or staggered full snapshot rollout approach to obtain full snapshots 235 of multiple objects 230. The staggered and adjustable approach for obtaining full snapshots 235 described herein may provide for the DMS 210 obtain full backups of a relatively large quantity of objects 230 while maintaining compliance and reliability for backing up enterprise data for one or more clients. In some examples, the DMS 210 may initiate the phased or staggered full snapshot rollout approach if the DMS 210 identifies that a quantity of objects 230 that are scheduled for full snapshots 235 exceeds a threshold quantity. The threshold quantity may be configured by the DMS 210, one or more administrators (e.g., clients), a network configuration, or any combination thereof. In some examples, the threshold may be based on compliance rules for one or more clients serviced by the DMS 210, a load of the DMS 210, one or more other conditions at the DMS 210, or any combination thereof. For example, the threshold may represent a quantity of full snapshots 235 the DMS 210 is capable of obtaining within a given time period while maintaining performance or compliance of the DMS 210 within a threshold level.

To obtain the full snapshots 235, the DMS 210 may initiate full snapshots 235 of different subset 240 of one or more objects 230 at a different times. For example, the DMS 210 may initiate full snapshots 235 of the objects within the subset 240-*a* at a first time, the DMS 210 may initiate full snapshots 235 of the objects within the subset 240-*b* at a second time subsequent to the first time, and the DMS 210 may initiate full snapshots 235 of the objects within the subset 240-*c* at a third time subsequent to the first and second times. The DMS 210 may continue to initiate full snapshots 235 of remaining subsets 240 of objects 230 (e.g., through the subset 240-*n*) at respective times until the DMS 210 obtains full snapshots 235 of all of the objects 230.

A size of the subsets 240 (e.g., a quantity of objects 230 included in each subset 240) may be determined by the DMS 210, the client administrators, or both. An initial size of the subsets 240 may be set at the beginning of the procedure, and the size may remain constant throughout the procedure or may change dynamically based on one or more parameters. In some examples, the initial subset size may correspond to a percentage of a total quantity of objects 230 that are scheduled for full backups. For example, each of the subsets 240-*a*, 240-*b*, and 240-*c* illustrated in FIG. 2 may include one percent of the objects 230 that are scheduled for full backups by the DMS 210, or some other percentage. The initial subset size may, in some examples, be configured based on one or more parameters associated with the DMS 210. For example, the initial subset size may be a maximum quantity of full snapshots 235 that the DMS 210 is capable of obtaining within a given time period while maintaining compliance and reliability associated with other jobs being executed by the DMS 210. In some examples, the initial subset size may be based on a load at the DMS 210.

In some examples, the client may select the initial subset size and may indicate the size to the DMS 210. For example, an administrator for enterprise data may determine a reasonable subset size based on a quantity of objects 230 included in the enterprise data, one or more compliance rules associated with the client or applications that use the client's objects 230, a desired timeline for obtaining the full snapshots 235, or any combination thereof. The administrator may indicate the initial subset size to the DMS 210 via a user interface of the computing device 215 and the network 220.

As described herein, the selection of which objects 230 to include in each subset 240) may be an automatic or autonomous process that may be associated with reduced complexity and resource consumption as compared with other techniques for scheduling full snapshots 235, such as using metadata (e.g., an AST). For example, the grouping of objects 230 into the subsets 240 may be based on an algorithm (e.g., a deterministic algorithm) at the DMS 210. The inputs to the algorithm may include the initial subset size, a starting time at which the full snapshot process is to begin (e.g., a calendar date or time instance), a duration of the full snapshot process (e.g., a quantity of days or a time period after the starting time at which the DMS 210 is to complete the full snapshots 235 of all of the objects 230), or any combination thereof. The algorithm may deterministically use the input information to select objects 230) to include in each subset 240).

Each object 230 may be associated with a unique ID (e.g., a universally unique ID (UUID)), which may be a multi-character ID that represents each object 230. In some examples, the algorithm may utilize the unique IDs of the objects to select which objects 230 to include in each subset 240. For example, objects 230 that are associated with unique IDs having values within a first range may be included in the first subset 240-a and objects 230 that are associated with unique IDs having values within a second range may be included in the second subset 240-b, and so on, where a size of each of the ranges may be determined based on the initial subset size. In some examples, a subset of characters of the unique IDs may be used to define the ranges of unique ID values in each subset 240.

In the example illustrated in FIG. 2, values of the first three characters of the unique IDs may be used. In this example, the first three characters of the unique ID may be in a range of 0x000-0xfff in hexadecimal, such that there may be 4096 (e.g., $16^3$) possible values of the unique IDs. In this example, objects 230 that correspond to unique IDs with first three digits having a value in the range of zero to 99 (e.g., 000-099 decimal or 0x000-0x063) may be included in the first subset 240-a. That is, full snapshots 235 may be enabled for such objects 230 in the first subset 240-a at the first time instance. Objects 230 that correspond to unique IDs with first three digits having a value in the range of 100 to 199 (e.g., 0x64-0xC7 in hexadecimal) may be included in the second subset 240-b and may be enabled for full snapshots 235 at a second time. The objects 230 may be assigned to each subset 240 in this manner (e.g., according to ranges of values of unique IDs) until the final objects 230 corresponding to unique IDs with first three digits having a value in the range of 4000 to 4095 (e.g., 0xFA0-0xFFF in hexadecimal) are included in a final subset 240-n that is enabled for full snapshots 235 at a final time instance. The range of values of the unique IDs, a quantity of digits of the unique IDs that are used to define the range, or both may vary based on one or more parameters associated with the full snapshot procedure. For example, the range may depend on the size of the subsets 240).

The size of the subsets 240 may be adjusted and changed from the initial subset size dynamically during the staggered or phased full snapshot rollout. For example, the DMS 210 may monitor a progress of the previously initiated full snapshots 235 and determine to adjust the subset size based on the progress. Additionally, or alternatively, the client may track the progress of the full snapshots 235 and transmit an indication to the DMS 210 to adjust the subset size based on the progress. In some examples, the client may request a different subset size based on a quantity of objects 230 of the client, or one or more other conditions or parameters associated with the client's enterprise data. In some examples, the DMS 210 may adjust the subset size based on a load on the DMS 210. For example, if the DMS 210 identifies that a load at the DMS 210 increased above a threshold load, the DMS 210 may select a smaller subset size (e.g., the DMS 210 may slow the phased full snapshot 235 rollout to reduce load). The DMS 210 may input the adjusted subset sizing to the algorithm, and the algorithm may select objects 230 to include in each subset 240) dynamically based on the input subset size.

The time instances at which the DMS 210 initiates the full snapshots 235 for each subset 240 may be periodic. That is, the full snapshots 235 for each subset 240 may be initiated periodically by the DMS 210 (e.g., an autonomous process). For example, the DMS 210 may initiate full snapshots 235 for a single subset 240 per day, or per some other time period or periodicity (e.g., every 12 hours, every 48 hours, every week, or the like). The periodicity may be based on one or more parameters, such as a size of the objects 230, a size of the subsets 240, a processing limit of the DMS 210, a load at the DMS 210, a quantity of objects 230, an average time for obtaining a full snapshot 235, one or more other parameters, or any combination thereof. For example, the DMS 210 may have a memory capacity which may determine the amount (e.g., quantity) of objects the DMS is capable of backing up at the same time. The DMS 210 may adjust the periodicity during the process, in some examples, based on a progress of previously initiated full snapshots 235. Additionally, or alternatively, in some examples, the DMS 210 may determine times at which to initiate full snapshots 235 for each subset 240 aperiodically based on one or more parameters. For example, the DMS 210 may initiate full snapshots 235 of the second subset 240-b after the full snapshots 235 of the first subset 240-a have been obtained and stored.

In some examples, the DMS 210 may pause or halt the phased full snapshot rollout based on a trigger condition. Pausing the full snapshot rollout may involve increasing a periodicity of the scheduled full snapshots 235, delaying initiation of full snapshots 235 for a subsequent subset 240, or both. As such, a time period between initiation of full snapshots 235 for two consecutive subsets 240 may increase due to the pause. In some examples, to pause the full snapshot rollout, the DMS 210 may change a percentage of objects 230 included in each subset 240 (e.g., a subset size) to zero percent for at least a time period based on the trigger condition. That is, the DMS 210 may refrain from initiating full snapshots 235 for any other objects 230 for at least the time period. For example, some objects may use more memory resources for a backup job (e.g., capturing full snapshots of a mailbox with a large quantity of small emails may use more memory resources of the DMS 210 than a mailbox with fewer emails), and accordingly, the acquisition of full snapshots 235 of some subsets 240 of objects may take longer or may more heavily load the DMS 210 than the acquisition of full snapshots 235 of some other subsets 240 of objects.

The trigger condition for pausing the full snapshot rollout may be, for example, a load at the DMS 210 exceeding a threshold load, a failure to obtain and store one or more full snapshots 235, a request from a client, or any combination thereof. In some examples, an average time for the DMS 210 to obtain full snapshots 235 of a subset 240 of objects 230 may be around 24 hours. However, while monitoring progress of previously initiated full snapshots 235, the DMS 210 may determine that at least some full snapshots 235 are still pending or are taking longer than the expected time. If such a backlog occurs, the DMS 210 may pause the rollout until the previously initiated full snapshots 235 are complete (e.g., until the backlog is cleared) to ensure that a load at the DMS 210 does not exceed a threshold. Additionally, or alternatively, the DMS 210 may pause the rollout based on a request from a client or an application or system that uses one or more of the objects 230. The DMS 210 may resume the rollout procedure by initiating full snapshots 235 of another subset 240 after the trigger condition is satisfied.

In some examples, after the DMS 210 obtains full snapshots 235 of all of the objects 230 that are scheduled for full snapshots 235 (e.g., for all of the subsets 240-*a* through 240-*n*), the DMS 210 may start obtaining incremental snapshots 245 of the objects 230. The DMS 210 may wait until after the full snapshots 235 are all completed to initiate the incremental snapshots 245 to reduce a load at the DMS 210 and maintain performance and reliability.

The DMS 210 described herein may thereby reliably obtain full snapshots 235 of a relatively large quantity of objects 230 using a staggered and automatic rollout procedure. The DMS 210 may use an algorithm to dynamically select subsets 240 of the objects 230 for which full snapshots 235 should be initiated at a time. The DMS 210 may dynamically adjust one or more parameters associated with the algorithm, such as timing parameters or sizes of the subsets 240 based on conditions at the DMS 210, client feedback, or both. The staggered or phased full snapshot rollout described herein may thereby provide for improved reliability and performance by the DMS 210 in scenarios in which the DMS 210 is to obtain a relatively large quantity of full snapshots 235.

Figure 3:
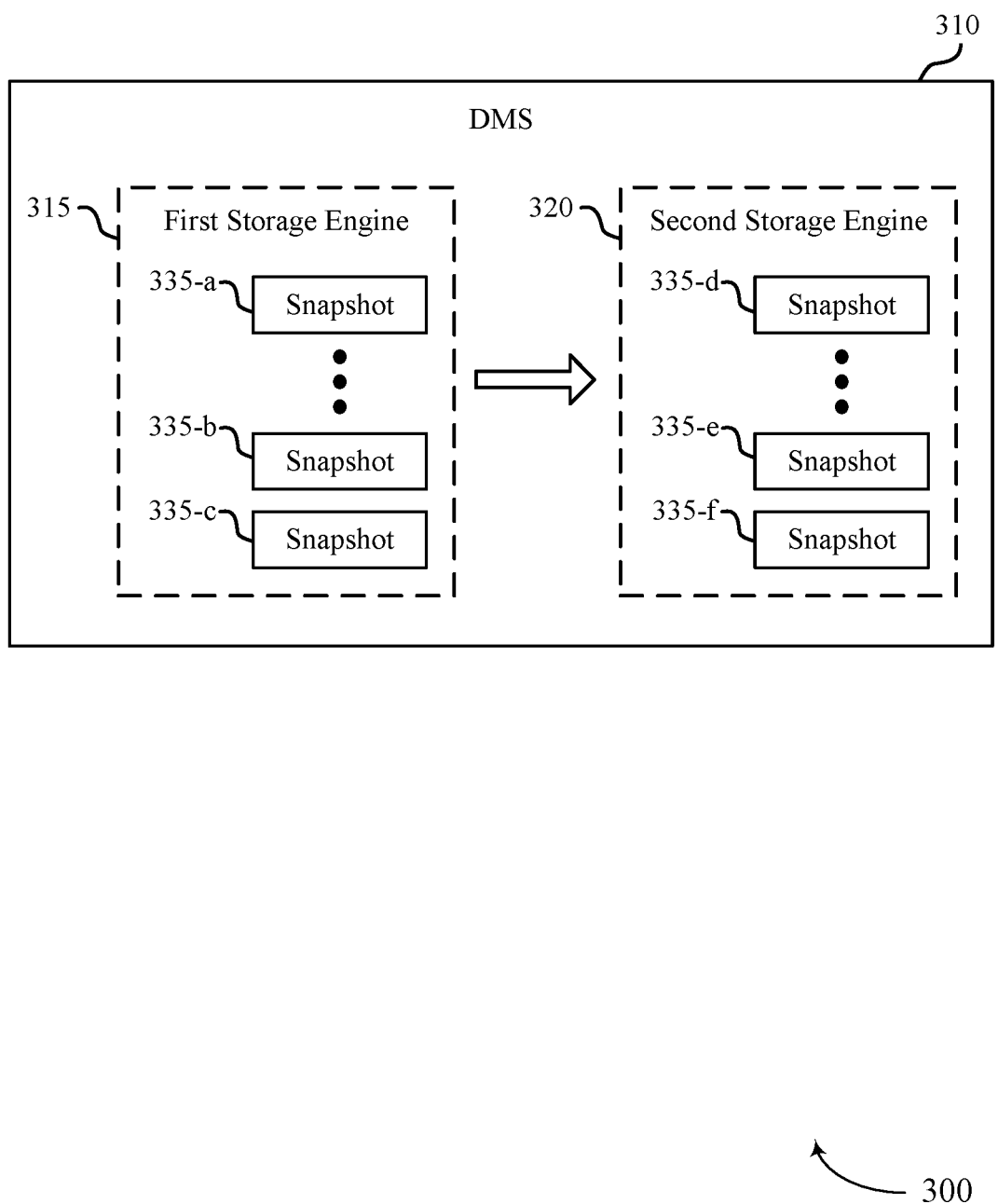
FIG. 3 illustrates an example of a computing environment that supports obtaining full snapshots for subsets of objects over time in accordance with aspects of the present disclosure.

FIG. 3 illustrates an example of a computing environment 300 that supports obtaining full snapshots for subsets of objects over time in accordance with aspects of the present disclosure. The computing environment 300 may implement or be implemented by aspects of the computing environments 100 and 200 described with reference to FIGS. 1 and 2. For example, the computing environment 300 includes a DMS 310, which may represent an example of a DMS 110 and a DMS 210, as described with reference to FIGS. 1 and 2. The DMS 310 may provide a data backup service for enterprise data associated with one or more computing systems (not illustrated in FIG. 3). In this example, the DMS 310 may switch from using a first storage engine 315 to using a second storage engine 320 for obtaining and storing snapshots 335 of enterprise data (e.g., computing objects).

The DMS 310 may use a storage engine to manage backups and storage of enterprise data for one or more clients. A storage engine may represent a software component of the DMS 310 that the DMS 310 uses to generate and store snapshots 335. In this example, the snapshots 335 may be one or more types of snapshots 335, such as full snapshots, incremental snapshots, or both.

In some examples, the DMS 310 may switch storage engines during operation. For example, the DMS 310 may switch from using the first storage engine 315 to using the second storage engine 320 while continuing to manage backup of enterprise data for clients. The first storage engine 315 and the second storage engine 320 may be incompatible. For example, a format of the snapshots 335-*a*, 335-*b*, and 335-*c* that are obtained and stored by the DMS 310 using the first storage engine 315 may be different than and incompatible with a format of the snapshots 335-*d*, 335-*e*, and 335-*f* that are obtained and stored by the DMS 310 using the second storage engine 320. In such cases, the DMS 310 may not transfer the previously obtained snapshots 335-*a*, 335-*b*, and 335-*c* from the first storage engine 315 to the second storage engine 320 after activation of the second storage engine. Instead, the DMS 310 may obtain new snapshots 335 of each computing object using the second storage engine 320 before deactivating the first storage engine 315 and deleting the corresponding snapshots 335-*a*. 335-*b*, and 335-*c*. The new snapshots may each be full snapshots 335, as the DMS 310 does not have previous base images of the objects using the second storage engine 320.

When the DMS 310 activates the second storage engine 320, a quantity of full snapshots 335 that are scheduled to be obtained by the DMS 310 may be relatively large. For example, the DMS 310 may be scheduled to obtain full snapshots 335 of all computing objects of all clients serviced by the DMS 310. In such cases, the quantity of scheduled full snapshots 335 may be greater than or equal to a threshold quantity. Accordingly, if all of the objects being serviced or managed by the DMS 310 are moved to the second storage engine 320 at a same time, a workload on the DMS 310 may be increased, and the DMS 310 may not support compliance for each of the computing objects due to the increased workload. Thus, the staggered or phased rollout of the full snapshots 335 described herein may be beneficial to reduce workload, improve efficiency, and maintain reliability and compliance of the services provided by the DMS 310.

The DMS 310 described herein may thereby initiate, using the second storage engine 320, full snapshots 335 of subsets of the computing objects at a time based on the DMS 310 activating the second storage engine 320. The DMS 310 may use an algorithm to automatically perform the phased or staggered full snapshot 335 rollout and may dynamically adjust a pace of the rollout based on one or more parameters or conditions of the DMS 310, based on client feedback, or both, as described in further detail elsewhere herein, including with reference to FIGS. 2 and 4. By obtaining full snapshots 335 of subsets of objects at a time, the DMS 310 may maintain a more reliable workload while switching between storage engines, as compared with systems in which the DMS 310 initiates full snapshots 335 of all of the computing objects at the same time after activation of the second storage engine 320.

The DMS 310 may monitor a progress of the full snapshots 335 using the second storage engine 320. In some examples, the DMS 310 may delete snapshots 335 from the first storage engine 315 once the corresponding objects have been backed up using the second storage engine 320 to save memory and storage space. For example, the DMS 310 may store metadata for each computing object backed up by the DMS 310 in a database (e.g., an AST or some other metadata table or database), and the DMS 310 may update the database to store information that indicates whether each computing object has been backed up using the second storage engine 320 and a status of the backups using the second storage engine 320.

Once the DMS 310 obtains a full or base snapshot 335 of a given computing object using the second storage engine 320, the DMS 310 may deactivate the first storage engine 315, which may delete the snapshots 335 associated with the first storage engine 315. The DMS 310 may start obtaining incremental snapshots 335 of the computing object over time. For example, the DMS 310 may generate an incremental snapshot 335 that depends from the snapshot 335-*d* (e.g., an incremental snapshot or a full snapshot) and indicates changes in a state of a computing object since the snapshot 335-*d* of the computing object was obtained. In some examples, the DMS 310 may refrain from obtaining incremental snapshots 335 of any computing objects using the second storage engine 320 until after the DMS 310 has obtained full snapshots 335 of all of the computing objects. For example, the DMS 310 may wait until after the staggered or phased full snapshot 335 rollout is complete to initiate incremental snapshot jobs.

The DMS 310 may thereby utilize the phased or staggered full snapshot 335 rollout process described herein when switching between storage engines to support such a storage engine change while maintaining reliability and compliance for backing up client data.

Figure 4:
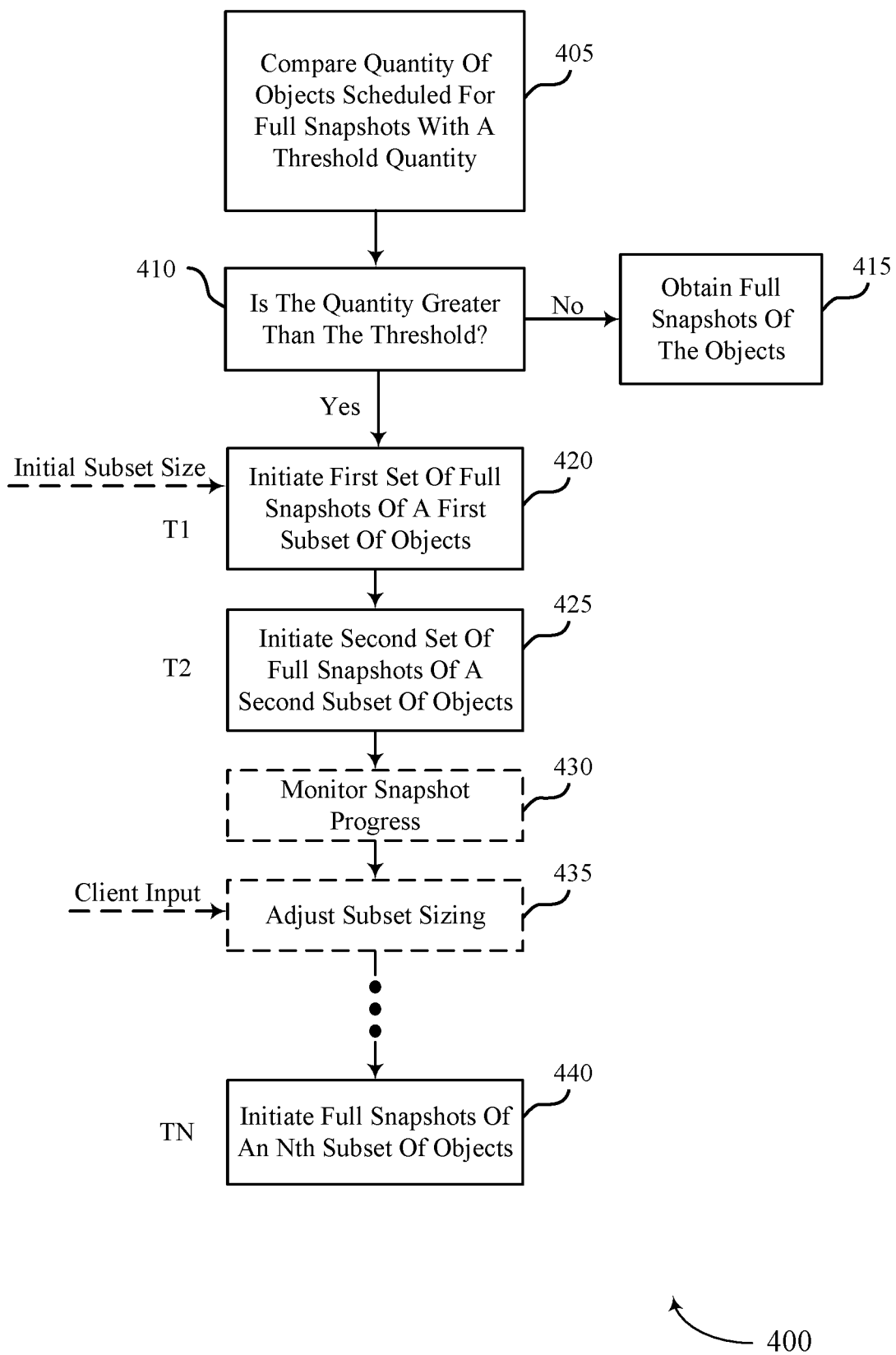
FIG. 4 illustrates an example of a flow diagram that supports obtaining full snapshots for subsets of objects over time in accordance with aspects of the present disclosure.

FIG. 4 illustrates an example of a flow diagram 400 that supports obtaining full snapshots for subsets of objects over time in accordance with aspects of the present disclosure. The flow diagram 400 may implement or be implemented by aspects of the computing environments 100, 200, and 300 described with reference to FIGS. 1-3. For example, the flow diagram 400 illustrates operations performed by a DMS, which may represent an example of a DMS as described with reference to FIGS. 1-3. In this example, the DMS may facilitate a staggered or phased full snapshot rollout when a quantity of objects scheduled for full snapshots is greater than a threshold.

In some aspects, the operations illustrated in the flow diagram 400 may be performed by hardware (e.g., including circuitry, processing blocks, logic components, and other components), code (e.g., software or firmware) executed by a processor, or any combination thereof. For example, aspects of the flow diagram 400 may be implemented or managed by a DMS, a storage engine, or some other software or application within a DMS that is configured to manage backup and restoration of computing resources for one or more clients.

At 405, the DMS may compare a quantity of objects that are scheduled for full snapshots with a threshold quantity. The DMS may compare the quantity with the threshold periodically or based on a condition being satisfied. For example, if the DMS activates a new storage engine, the DMS may compare the quantity of objects scheduled for full snapshots using the new storage engine of the DMS with the threshold quantity. The threshold quantity may be configured by the DMS based on a maximum workload that the DMS can support while maintaining compliance and reliability. Additionally, or alternatively, the threshold quantity may be configured by one or more administrators of the client data that is backed up by the DMS.

At 410, the DMS may determine whether the quantity of objects scheduled for full snapshots is greater than the threshold quantity. At 415, if the DMS determines that the quantity of objects scheduled for the full snapshots is less than the threshold quantity, the DMS may initiate full snapshots of the quantity of objects. The DMS may thereby obtain and store the full snapshots of the objects within a same time period based on the quantity of objects being less than the threshold quantity. In this example, because the quantity of objects is less than the threshold quantity, the DMS may maintain compliance for the client data while obtaining the full snapshots and executing other data management tasks for multiple clients.

At 420, if the DMS determines that the quantity of objects scheduled for the full snapshots is greater than or equal to the threshold, the DMS may initiate a first set of full snapshots of a first subset of objects at a first time T1. That is, the DMS may initiate the full snapshot rollout procedure described herein based on the quantity of scheduled full snapshots being greater than the threshold quantity. The first subset of objects may represent an example of the first subset 240-*a* described with reference to FIG. 2. In some examples, as described with reference to FIG. 2, the DMS may determine the initial subset size (e.g., quantity of objects included in the first subset) based on a workload of the DMS, or the DMS may receive an indication of the initial subset size from an administrator of client data. The initial subset size may correspond to a percentage of the quantity of objects and may be the same across multiple clients or may be different per client.

At 425, the DMS may initiate a second set of full snapshots of a second subset of objects at a second time T2 that is subsequent to the first time T1. The second subset of objects may represent an example of the second subset 240-*b* described with reference to FIG. 2. In some examples, a time period between the first time T1 and the second time T2 may be based on a periodicity of the staggered or phased full snapshot rollout, which may be set by the DMS based on an average time period for obtaining full snapshots. As described with reference to FIG. 2, the DMS may select the objects to include in the first and second subsets automatically based on an algorithm.

At 430, in some examples, the DMS may monitor a progress of the first and second sets of full snapshots. For example, the DMS may monitor a metadata table that is updated to indicate a status of the full snapshots (e.g., a current stage of the full snapshot jobs). The DMS may adjust a periodicity of the full snapshot rollout or may determine a time at which to initiate a subsequent subset of full snapshots, or both, based on the progress. The DMS may feedback the progress of the full snapshots to one or more administrators of client data. In some examples, the DMS may pause the full snapshot rollout for a time period or otherwise adjust a timing of the full snapshot rollout based on the progress of the full snapshots or one or more other trigger conditions, as described in further detail elsewhere herein, including with reference to FIG. 2.

At 435, in some examples, the DMS may adjust a subset sizing associated with the full snapshot rollout. For example, the DMS may determine to increase or reduce a percentage of objects that are included in each subset of objects. The DMS may determine to adjust the percentage of objects for which snapshots are enabled per time period based on a load supported by the DMS. Additionally, or alternatively, the DMS may receive client input or feedback that indicates an adjusted subset sizing. That is, the DMS may adjust the subset sizing based on requests from one or more clients. A client may request an increased or decreased subset sizing based on a changed timeline within which the client wishes to have their data fully backed up, or based on an average size of the computing objects of the client, or based on the progress of the previously initiated full snapshots, or any combination thereof.

The DMS may continue to initiate respective sets of full snapshots for respective subsets of objects over time using the adjusted subset sizing. The DMS may determine the subsets of objects from among the quantity of objects that are scheduled for full snapshots based on an algorithm at the DMS. Although not illustrated in FIG. 4, it is to be understood that the DMS may adjust the subset sizing, the timing of the full snapshot rollout, or both at any given time. For example, the DMS may adjust the subset sizing before obtaining the second full snapshots of the second subset of objects, and the second subset may include a different quantity of objects than the first subset, in some examples.

At 440, the DMS may initiate full snapshots of an Nth subset of objects at a time TN. The quantity of objects that are scheduled for the full snapshots by the DMS may be divided into N subsets. Accordingly, the Nth subset of objects may be a final subset of objects of which the DMS is scheduled to obtain full snapshots. Accordingly, after obtaining the full snapshots of the Nth subset of objects, the DMS may have completed the full snapshot rollout. In some examples, if the DMS activated a new storage engine, the DMS may remove or deactivate a previously used storage engine after obtaining the full snapshots of the Nth subset of objects.

In some examples, the DMS may initiate incremental snapshots of the objects after completing the full snapshot rollout. For example, the DMS may periodically monitor the objects to detect changes in a state of one or more objects over time, and the DMS may initiate an incremental snapshot for a given object if the DMS detects a state of the object has changed.

The DMS may thereby perform an automatic phased or staggered rollout for obtaining full snapshots of a relatively large quantity of objects. By utilizing an algorithm to divide the relatively large quantity of objects into subsets and initiating acquisitions of full snapshots of objects within each subset at different times, the DMS may reliably and efficiently obtain all of the full snapshots. The described techniques may reduce a likelihood that the DMS is unable to maintain compliance standards for one or more clients while performing relatively large quantities of full backups.

Figure 5:
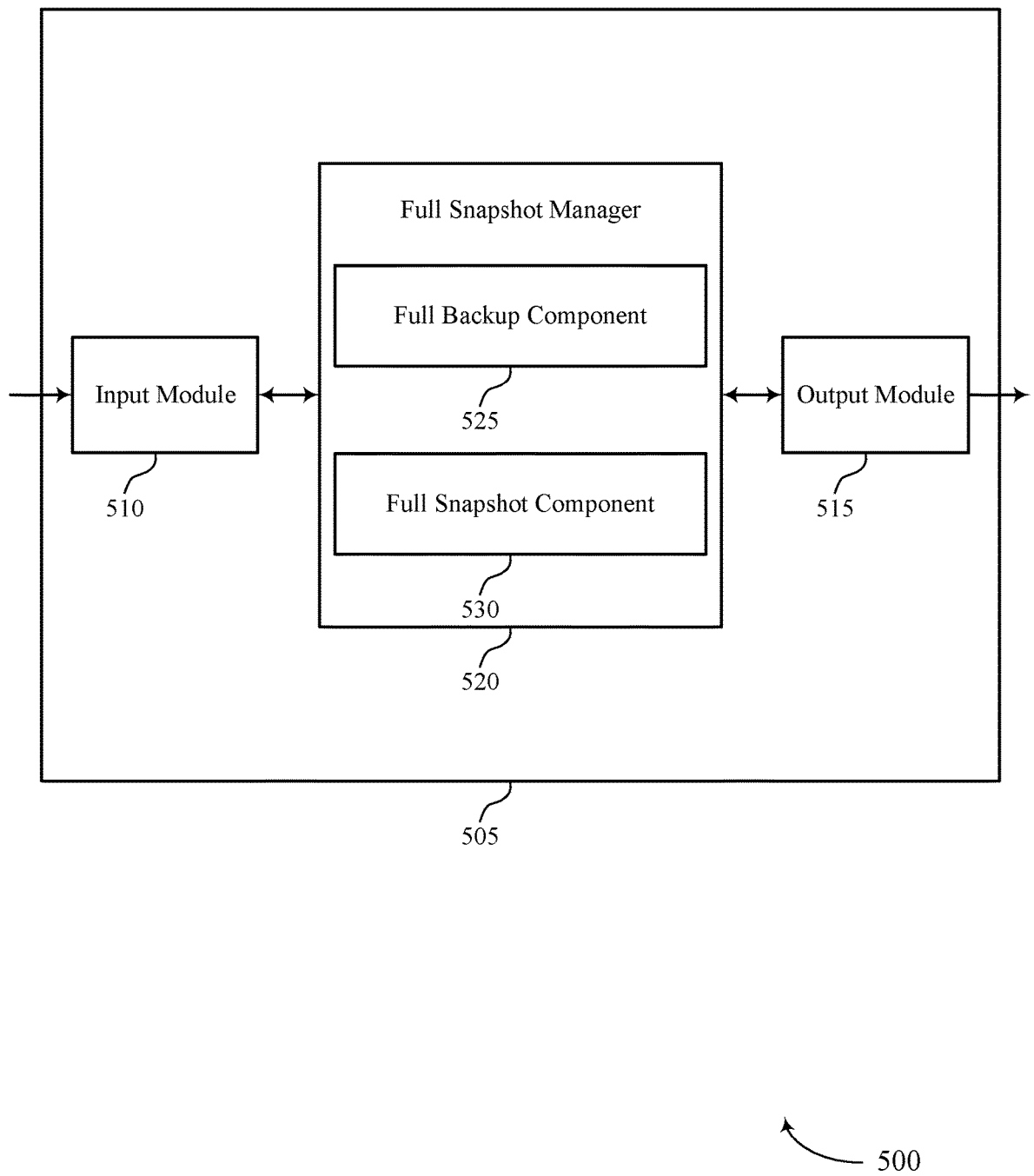
FIG. 5 illustrates a block diagram of an apparatus that supports obtaining full snapshots for subsets of objects over time in accordance with aspects of the present disclosure.

FIG. 5 illustrates a block diagram 500 of a system 505 that supports obtaining full snapshots for subsets of objects over time in accordance with aspects of the present disclosure. In some examples, the system 505 may be an example of aspects of one or more components described with reference to FIG. 1, such as a DMS 110. The system 505 may include an input module 510, an output module 515, and a full snapshot manager 520. The system 505 may also include one or more processors. Each of these components may be in communication with one another (e.g., via one or more buses, communications links, communications interfaces, or any combination thereof).

The input module 510 may manage input signaling for the system 505. For example, the input module 510 may receive input signaling (e.g., messages, packets, data, instructions, commands, or any other form of encoded information) from other systems or devices. The input module 510 may send signaling corresponding to (e.g., representative of or otherwise based on) such input signaling to other components of the system 505 for processing. For example, the input module 510 may transmit input signals to the full snapshot manager 520 to support obtaining full snapshots for subsets of objects over time. In some cases, the input module 510 may be a component of a network interface 715 as described with reference to FIG. 7.

The output module 515 may manage output signaling for the system 505. For example, the output module 515 may receive signals from other components of the system 505, such as the full snapshot manager 520, and may transmit such output signaling corresponding to (e.g., representative of or otherwise based on) such signaling to other systems or devices. In some cases, the output module 515 may be a component of a network interface 715 as described with reference to FIG. 7.

For example, the full snapshot manager 520 may include a full backup component 525 a full snapshot component 530, or any combination thereof. In some examples, the full snapshot manager 520, or various components thereof, may be configured to perform various operations (e.g., receiving, monitoring, transmitting) using or otherwise in cooperation with the input module 510, the output module 515, or both. For example, the full snapshot manager 520 may receive information from the input module 510, send information to the output module 515, or be integrated in combination with the input module 510, the output module 515, or both to receive information, transmit information, or perform various other operations as described herein.

The full backup component 525 may be configured as or otherwise support a means for determining, by a DMS, that a set of multiple objects scheduled for full backups by the DMS includes a quantity of objects that exceeds a threshold quantity. The full snapshot component 530 may be configured as or otherwise support a means for initiating at a first time, based on the quantity of objects exceeding the threshold quantity, a first set of full snapshots corresponding to a first subset of objects included in the set of multiple objects. The full snapshot component 530 may be configured as or otherwise support a means for initiating at a second time subsequent to the first time, based on the quantity of objects exceeding the threshold quantity, a second set of full snapshots corresponding to a second subset of objects included in the set of multiple objects, the second subset of objects different than the first subset of objects.

Figure 6:
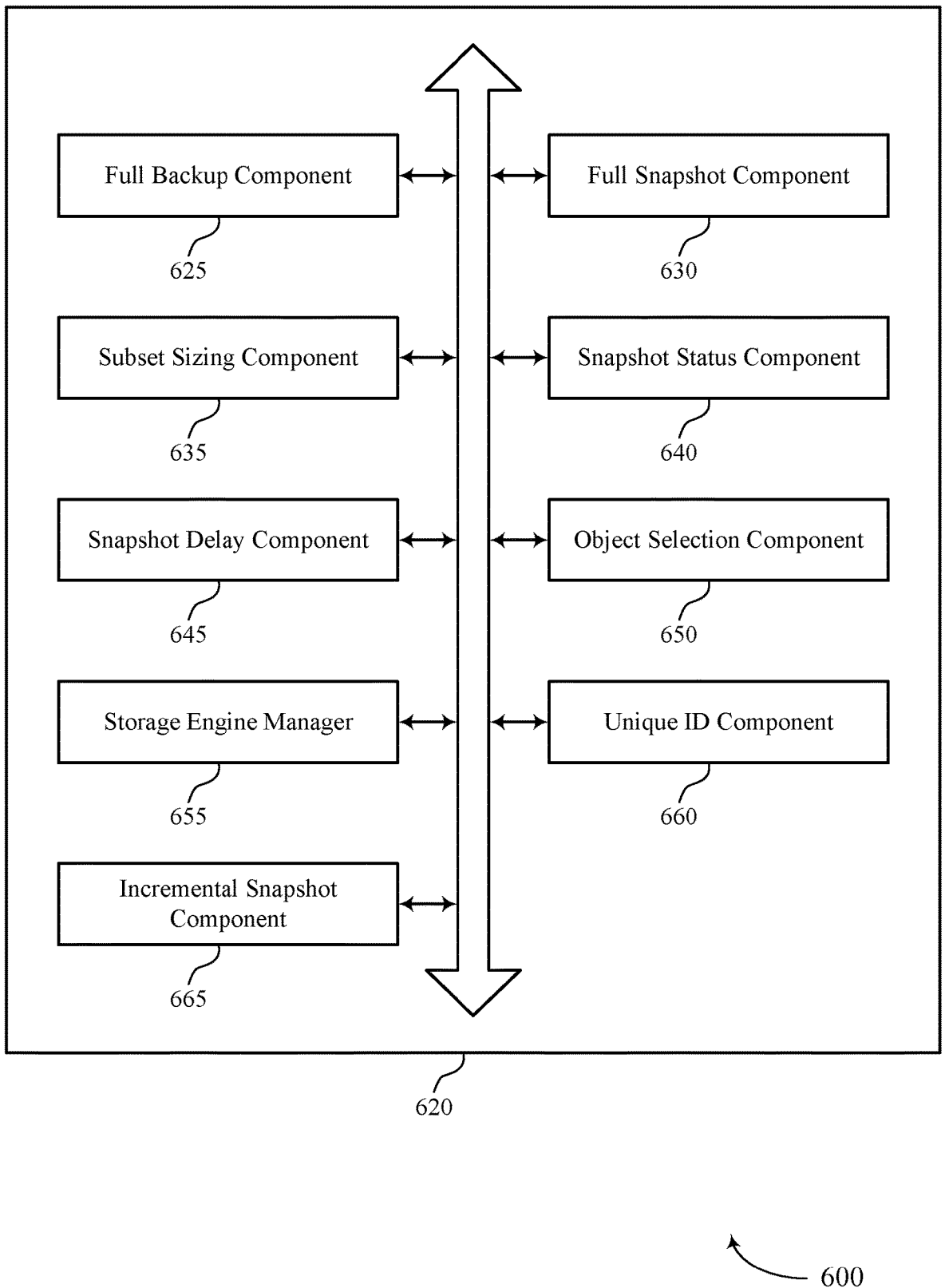
FIG. 6 illustrates a block diagram of a full snapshot manager that supports obtaining full snapshots for subsets of objects over time in accordance with aspects of the present disclosure.

FIG. 6 illustrates a block diagram 600 of a full snapshot manager 620 that supports obtaining full snapshots for subsets of objects over time in accordance with aspects of the present disclosure. The full snapshot manager 620 may be an example of aspects of a full snapshot manager or a full snapshot manager 520, or both, as described herein. The full snapshot manager 620, or various components thereof, may be an example of means for performing various aspects of obtaining full snapshots for subsets of objects over time as described herein. For example, the full snapshot manager 620 may include a full backup component 625, a full snapshot component 630, a subset sizing component 635, a snapshot status component 640, a snapshot delay component 645, an object selection component 650, a storage engine manager 655, a unique ID component 660, an incremental snapshot component 665, or any combination thereof. Each of these components may communicate, directly or indirectly, with one another (e.g., via one or more buses).

The full backup component 625 may be configured as or otherwise support a means for determining, by a DMS, that a set of multiple objects scheduled for full backups by the DMS includes a quantity of objects that exceeds a threshold quantity. The full snapshot component 630 may be configured as or otherwise support a means for initiating at a first time, based on the quantity of objects exceeding the threshold quantity, a first set of full snapshots corresponding to a first subset of objects included in the set of multiple objects. In some examples, the full snapshot component 630 may be configured as or otherwise support a means for initiating at a second time subsequent to the first time, based on the quantity of objects exceeding the threshold quantity, a second set of full snapshots corresponding to a second subset of objects included in the set of multiple objects, the second subset of objects different than the first subset of objects.

In some examples, the subset sizing component 635 may be configured as or otherwise support a means for determining, for inclusion in the first subset of objects, a first quantity of objects corresponding to a percentage of the set of multiple objects.

In some examples, the subset sizing component 635 may be configured as or otherwise support a means for receiving an indication of the percentage. In some examples, the second subset of objects includes a second quantity of objects that is equal to the first quantity based on the percentage.

In some examples, the subset sizing component 635 may be configured as or otherwise support a means for receiving a second indication of a second percentage of the set of multiple objects, where the second subset of objects includes a second quantity of objects that corresponds to the second percentage.

In some examples, the snapshot status component 640 may be configured as or otherwise support a means for monitoring, after initiating the first set of full snapshots corresponding to the first subset of objects, a status of the first set of full snapshots, where the status corresponds to a percentage of full snapshots of the first set of full snapshots that are pending, a percentage of full snapshots of the first set of full snapshots that have been obtained by the DMS, or both. In some examples, the subset sizing component 635 may be configured as or otherwise support a means for determining, for inclusion in the second subset of objects, a second quantity of objects based on the status of the first set of full snapshots.

In some examples, the snapshot status component 640 may be configured as or otherwise support a means for transmitting a report that indicates the status of the first set of full snapshots based on the monitoring. In some examples, the subset sizing component 635 may be configured as or otherwise support a means for receiving, in response to the report, an indication of the second quantity based on the status.

In some examples, the snapshot status component 640 may be configured as or otherwise support a means for monitoring, after initiating the second set of full snapshots corresponding to the second subset of objects, a second status of the second set of full snapshots, where the second status indicates a percentage of full snapshots of the second set of full snapshots that are pending, a percentage of full snapshots of the second set of full snapshots that have been obtained by the DMS, or both. In some examples, the subset sizing component 635 may be configured as or otherwise support a means for determining a third quantity of a third subset of objects based on the status of the first set of full snapshots and the second status of the second set of full snapshots. In some examples, the full snapshot component 630 may be configured as or otherwise support a means for initiating, at a third time subsequent to the second time, based on the quantity of objects exceeding the threshold quantity, a third set of full snapshots corresponding to the third subset of objects included in the set of multiple objects, the third subset of objects different from the first subset of objects and the second subset of objects.

In some examples, the full backup component 625 may be configured as or otherwise support a means for determining a quantity of backup jobs being executed by the DMS within a time period prior to the second time. In some examples, the subset sizing component 635 may be configured as or otherwise support a means for determining, for inclusion in the second subset of objects, a second quantity of objects based on the quantity of jobs being executed by the DMS.

In some examples, the snapshot delay component 645 may be configured as or otherwise support a means for detecting a trigger condition associated with the DMS. In some examples, the snapshot delay component 645 may be configured as or otherwise support a means for delaying initiation of the second set of full snapshots based on detecting the trigger condition, where a time period between the first time and the second time is increased based on delaying the second time.

In some examples, the object selection component 650 may be configured as or otherwise support a means for selecting objects from among the set of multiple objects to include in the first subset of objects based on first values of first unique IDs associated with the first subset of objects. In some examples, the object selection component 650 may be configured as or otherwise support a means for selecting objects from among the set of multiple objects to include in the second subset of objects based on second values of second unique IDs associated with the second subset of objects.

In some examples, the unique ID component 660 may be configured as or otherwise support a means for determining a first range of unique ID values based on a first target size of the first subset of objects and a target time period for obtaining the full backups of the set of multiple objects, where the first subset of objects is based on the first values of the first unique IDs associated with the first subset of objects being within the first range. In some examples, the unique ID component 660 may be configured as or otherwise support a means for determining a second range of unique ID values based on a second target size of the second subset of objects and the target time period, where the second subset of objects is based on the second values of the second unique IDs associated with the second subset of objects being within the second range.

In some examples, the storage engine manager 655 may be configured as or otherwise support a means for activating, by the DMS, a storage engine. In some examples, the full backup component 625 may be configured as or otherwise support a means for scheduling, based on activating the storage engine, the set of multiple objects for the full backups in accordance with the storage engine.

In some examples, the full snapshot component 630 may be configured as or otherwise support a means for obtaining, by the DMS and using a second storage engine before activating the storage engine, second full snapshots corresponding to the set of multiple objects, where a second format of the second full snapshots obtained using the second storage engine is different than a first format of full snapshots obtained using the storage engine.

In some examples, the full snapshot component 630 may be configured as or otherwise support a means for obtaining the first set of full snapshots, the second set of full snapshots, and other sets of full snapshots corresponding to other subsets of objects included in set of multiple objects. In some examples, the incremental snapshot component 665 may be configured as or otherwise support a means for initiating, in response to obtaining full snapshots corresponding to all of the set of multiple objects using the storage engine, incremental snapshots corresponding to the set of multiple objects using the storage engine.

Figure 7:
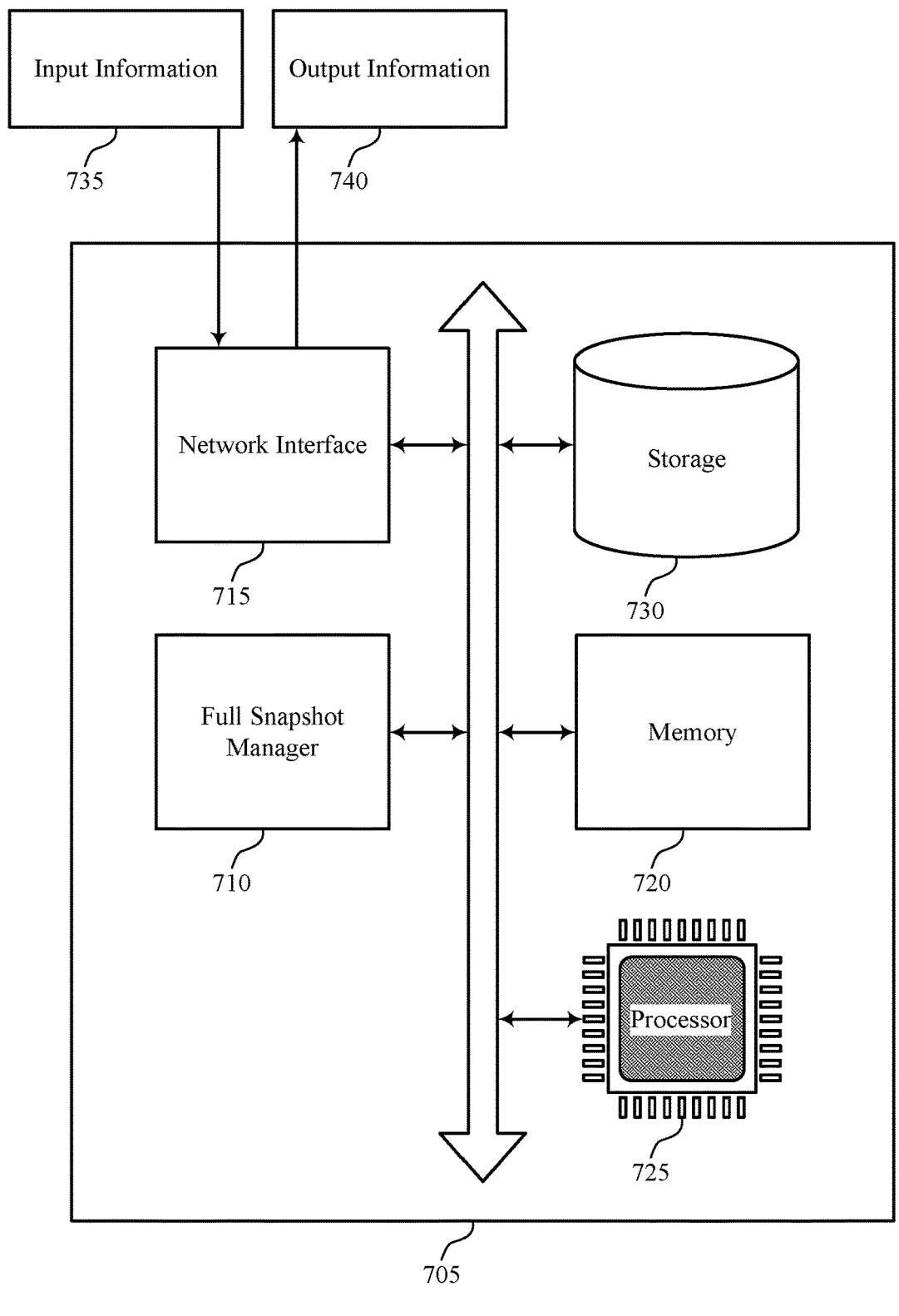
FIG. 7 illustrates a diagram of a system including a device that supports obtaining full snapshots for subsets of objects over time in accordance with aspects of the present disclosure.

FIG. 7 illustrates a block diagram 700 if a system 705 that supports obtaining full snapshots for subsets of objects over time in accordance with aspects of the present disclosure. The system 705 may be an example of or include the components of a system 505 as described herein. The system 705 may include components for data management, including components such as a full snapshot manager 710, a network interface 715, memory 720, processor 725, and storage 730. These components may be in electronic communication or otherwise coupled (e.g., operatively, communicatively, functionally, electronically, electrically) via one or more buses, communications links, communications interfaces, or any combination thereof). Additionally, the components of the system 705 may comprise corresponding physical components or may be implemented as corresponding virtual components (e.g., components of one or more VMs). In some examples, the system 705 may be an example of aspects of one or more components described with reference to FIG. 1, such as a DMS 110.

The network interface 715 may enable the system 705 to exchange information (e.g., input information 735, output information 740, or both) with other systems or devices (not shown). For example, the network interface 715 may enable the system 705 to connect to a network (e.g., a network 120 as described herein). The network interface 715 may include one or more wireless network interfaces, one or more wired network interfaces, or any combination thereof. In some examples, the network interface 715 may be an example of may be an example of aspects of one or more components described with reference to FIG. 1, such as one or more network interfaces 165.

Memory 720 may include RAM, ROM, or both. The memory 720 may store computer-readable, computer-executable software including instructions that, when executed, cause the processor 725 to perform various functions described herein. In some cases, the memory 720 may contain, among other things, a basic input/output system (BIOS), which may control basic hardware or software operation such as the interaction with peripheral components or devices. In some cases, the memory 720 may be an example of aspects of one or more components described with reference to FIG. 1, such as one or more memories 175.

The processor 725 may include an intelligent hardware device, (e.g., a general-purpose processor, a digital signal processor (DSP), a CPU, a microcontroller, an application-specific integrated circuit (ASIC), a field programmable gate array (FPGA), a programmable logic device, a discrete gate or transistor logic component, a discrete hardware component, or any combination thereof). The processor 725 may be configured to execute computer-readable instructions stored in a memory 720 to perform various functions (e.g., functions or tasks supporting obtaining full snapshots for subset of objects over time). Though a single processor 725 is depicted in the example of FIG. 7, it is to be understood that the system 705 may include any quantity of one or more of processors 725 and that a group of processors 725 may collectively perform one or more functions ascribed herein to a processor, such as the processor 725. In some cases, the processor 725 may be an example of aspects of one or more components described with reference to FIG. 1, such as one or more processors 170.

Storage 730 may be configured to store data that is generated, processed, stored, or otherwise used by the system 705. In some cases, the storage 730 may include one or more HDDs, one or more SDDs, or both. In some examples, the storage 730 may be an example of a single database, a distributed database, multiple distributed databases, a data store, a data lake, or an emergency backup database. In some examples, the storage 730 may be an example of one or more components described with reference to FIG. 1, such as one or more network disks 180.

The full snapshot manager 710 may be configured as or otherwise support a means for determining, by a DMS, that a set of multiple objects scheduled for full backups by the DMS includes a quantity of objects that exceeds a threshold quantity. The full snapshot manager 710 may be configured as or otherwise support a means for initiating at a first time, based on the quantity of objects exceeding the threshold quantity, a first set of full snapshots corresponding to a first subset of objects included in the set of multiple objects. The full snapshot manager 710 may be configured as or otherwise support a means for initiating at a second time subsequent to the first time, based on the quantity of objects exceeding the threshold quantity, a second set of full snapshots corresponding to a second subset of objects included in the set of multiple objects, the second subset of objects different than the first subset of objects.

By including or configuring the full snapshot manager 710 in accordance with examples as described herein, the system 705 may support techniques for improved data management reliability, improved DMS performance and compliance for applications and systems that use objects managed by the system 705, reduced power consumption, reduced processing complexity.

Figure 8:
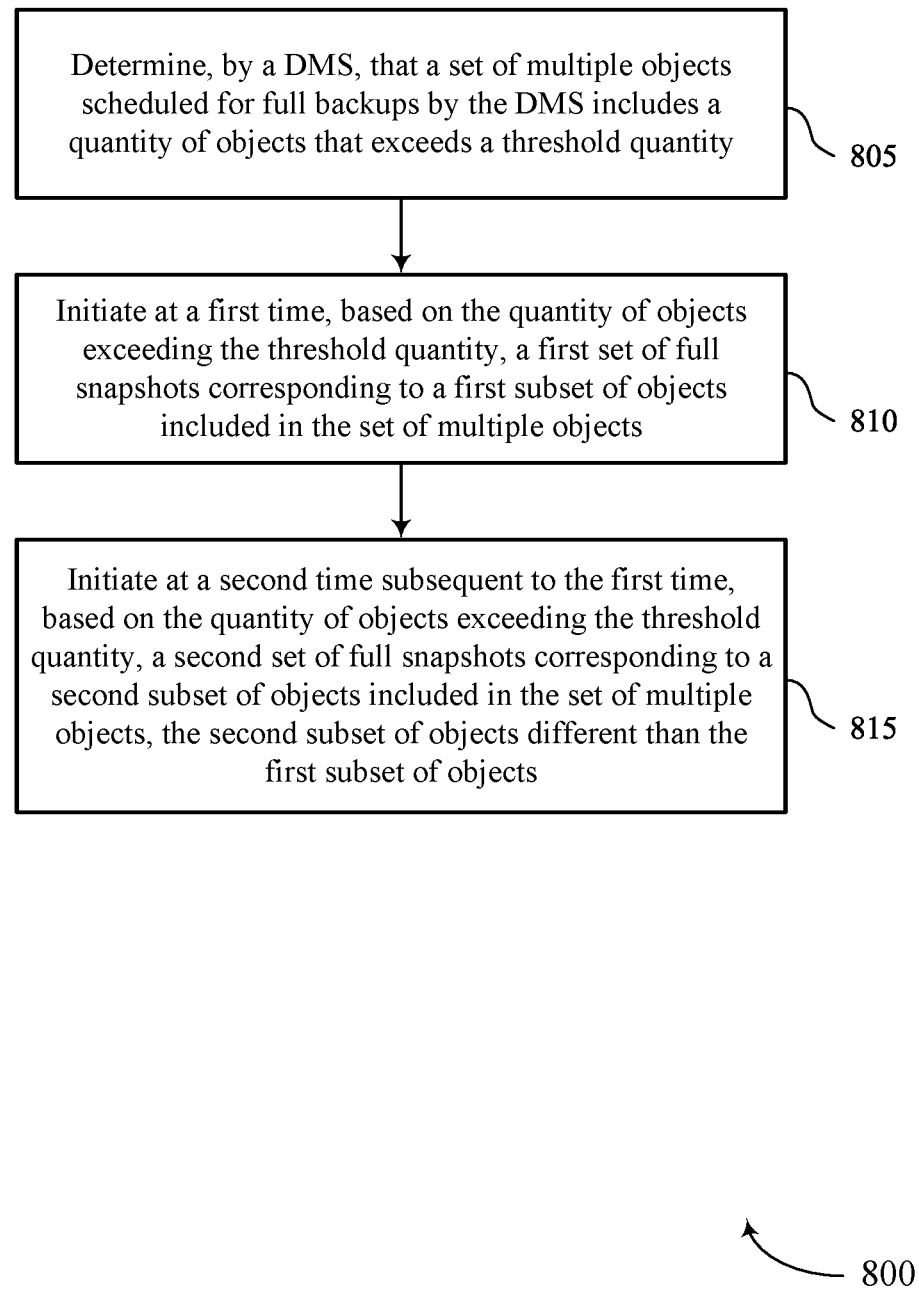
FIGS. 8 through 11 illustrate flowcharts showing methods that support obtaining full snapshots for subsets of objects over time in accordance with aspects of the present disclosure.

FIG. 8 illustrates a flowchart showing a method 800 that supports obtaining full snapshots for subsets of objects over time in accordance with aspects of the present disclosure. The operations of the method 800 may be implemented by a DMS or its components as described herein. For example, the operations of the method 800 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 805, the method may include determining, by a DMS, that a set of multiple objects scheduled for full backups by the DMS includes a quantity of objects that exceeds a threshold quantity. The operations of 805 may be performed in accordance with examples as disclosed herein. In some examples, aspects of the operations of 805 may be performed by a full backup component 625 as described with reference to FIG. 6.

At 810, the method may include initiating at a first time, based on the quantity of objects exceeding the threshold quantity, a first set of full snapshots corresponding to a first subset of objects included in the set of multiple objects. The operations of 810 may be performed in accordance with examples as disclosed herein. In some examples, aspects of the operations of 810 may be performed by a full snapshot component 630 as described with reference to FIG. 6.

At 815, the method may include initiating at a second time subsequent to the first time, based on the quantity of objects exceeding the threshold quantity, a second set of full snapshots corresponding to a second subset of objects included in the set of multiple objects, the second subset of objects different than the first subset of objects. The operations of 815 may be performed in accordance with examples as disclosed herein. In some examples, aspects of the operations of 815 may be performed by a full snapshot component 630 as described with reference to FIG. 6.

Figure 9:
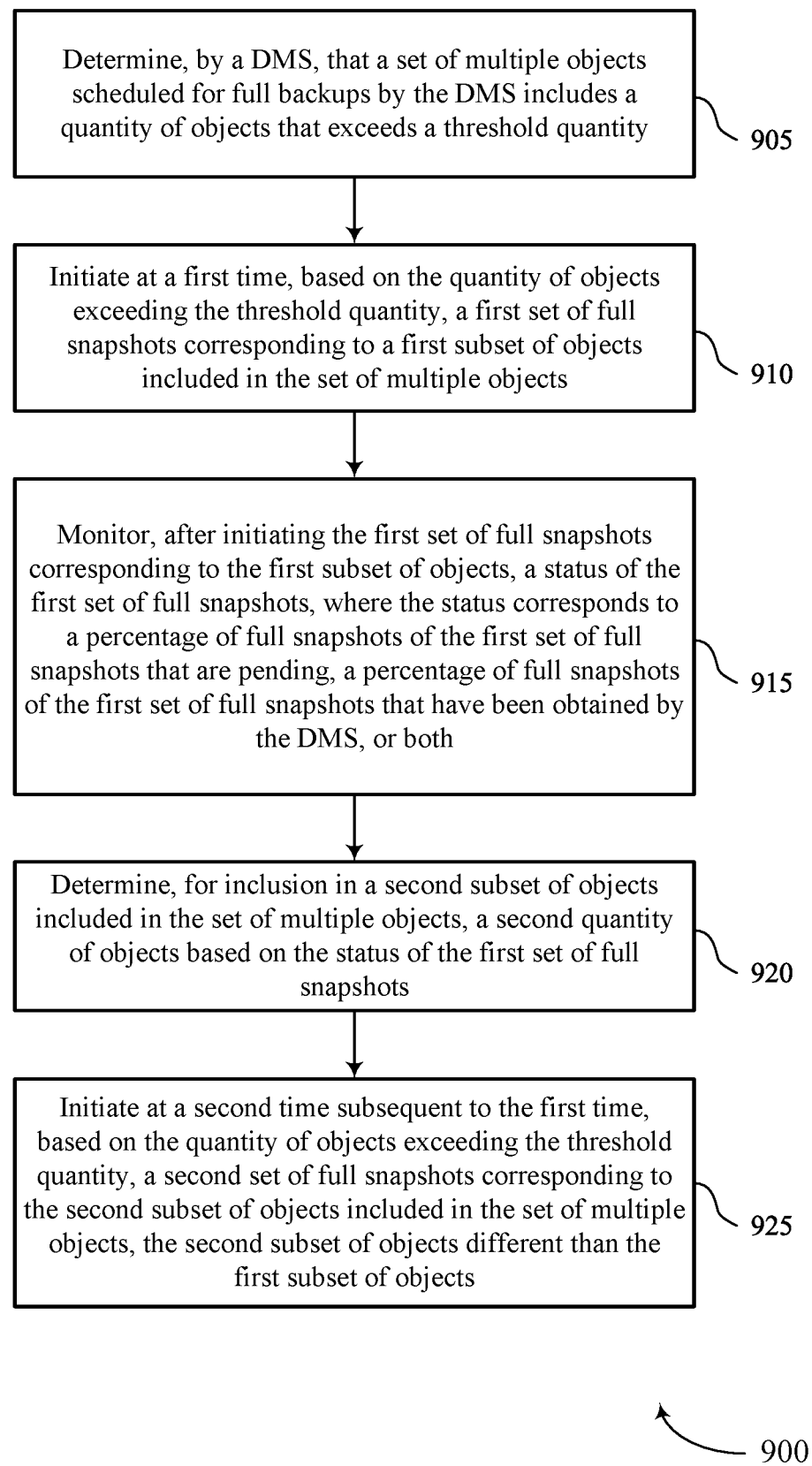

FIG. 9 illustrates a flowchart showing a method 900 that supports obtaining full snapshots for subsets of objects over time in accordance with aspects of the present disclosure. The operations of the method 900 may be implemented by a DMS or its components as described herein. For example, the operations of the method 900 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 905, the method may include determining, by a DMS, that a set of multiple objects scheduled for full backups by the DMS includes a quantity of objects that exceeds a threshold quantity. The operations of 905 may be performed in accordance with examples as disclosed herein. In some examples, aspects of the operations of 905 may be performed by a full backup component 625 as described with reference to FIG. 6.

At 910, the method may include initiating at a first time, based on the quantity of objects exceeding the threshold quantity, a first set of full snapshots corresponding to a first subset of objects included in the set of multiple objects. The operations of 910 may be performed in accordance with examples as disclosed herein. In some examples, aspects of the operations of 910 may be performed by a full snapshot component 630 as described with reference to FIG. 6.

At 915, the method may include monitoring, after initiating the first set of full snapshots corresponding to the first subset of objects, a status of the first set of full snapshots, where the status corresponds to a percentage of full snapshots of the first set of full snapshots that are pending, a percentage of full snapshots of the first set of full snapshots that have been obtained by the DMS, or both. The operations of 915 may be performed in accordance with examples as disclosed herein. In some examples, aspects of the operations of 915 may be performed by a snapshot status component 640 as described with reference to FIG. 6.

At 920, the method may include determining, for inclusion in a second subset of objects included in the set of multiple objects, a second quantity of objects based on the status of the first set of full snapshots. The operations of 920 may be performed in accordance with examples as disclosed herein. In some examples, aspects of the operations of 920 may be performed by a subset sizing component 635 as described with reference to FIG. 6.

At 925, the method may include initiating at a second time subsequent to the first time, based on the quantity of objects exceeding the threshold quantity, a second set of full snapshots corresponding to the second subset of objects included in the set of multiple objects, the second subset of objects different than the first subset of objects. The operations of 925 may be performed in accordance with examples as disclosed herein. In some examples, aspects of the operations of 925 may be performed by a full snapshot component 630 as described with reference to FIG. 6.

Figure 10:
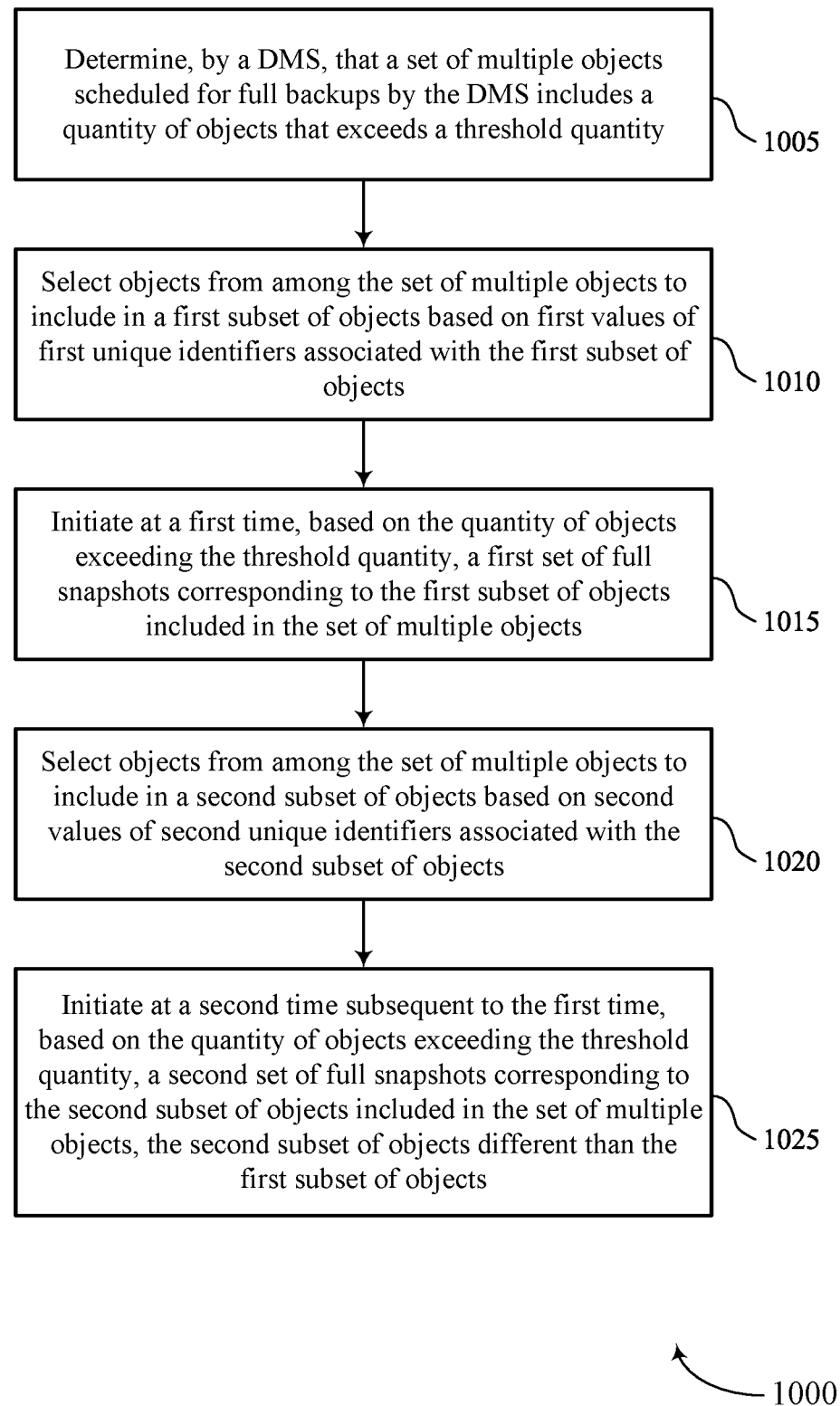

FIG. 10 illustrates a flowchart showing a method 1000 that supports obtaining full snapshots for subsets of objects over time in accordance with aspects of the present disclosure. The operations of the method 1000 may be implemented by a DMS or its components as described herein. For example, the operations of the method 1000 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 1005, the method may include determining, by a DMS, that a set of multiple objects scheduled for full backups by the DMS includes a quantity of objects that exceeds a threshold quantity. The operations of 1005 may be performed in accordance with examples as disclosed herein. In some examples, aspects of the operations of 1005 may be performed by a full backup component 625 as described with reference to FIG. 6.

At 1010, the method may include selecting objects from among the set of multiple objects to include in a first subset of objects based on first values of first unique IDs associated with the first subset of objects. The operations of 1010 may be performed in accordance with examples as disclosed herein. In some examples, aspects of the operations of 1010 may be performed by an object selection component 650 as described with reference to FIG. 6.

At 1015, the method may include initiating at a first time, based on the quantity of objects exceeding the threshold quantity, the first set of full snapshots corresponding to a first subset of objects included in the set of multiple objects. The operations of 1015 may be performed in accordance with examples as disclosed herein. In some examples, aspects of the operations of 1015 may be performed by a full snapshot component 630 as described with reference to FIG. 6.

At 1020, the method may include selecting objects from among the set of multiple objects to include in a second subset of objects based on second values of second unique IDs associated with the second subset of objects. The operations of 1020 may be performed in accordance with examples as disclosed herein. In some examples, aspects of the operations of 1020 may be performed by an object selection component 650 as described with reference to FIG. 6.

At 1025, the method may include initiating at a second time subsequent to the first time, based on the quantity of objects exceeding the threshold quantity, a second set of full snapshots corresponding to the second subset of objects included in the set of multiple objects, the second subset of objects different than the first subset of objects. The operations of 1025 may be performed in accordance with examples as disclosed herein. In some examples, aspects of the operations of 1025 may be performed by a full snapshot component 630 as described with reference to FIG. 6.

Figure 11:
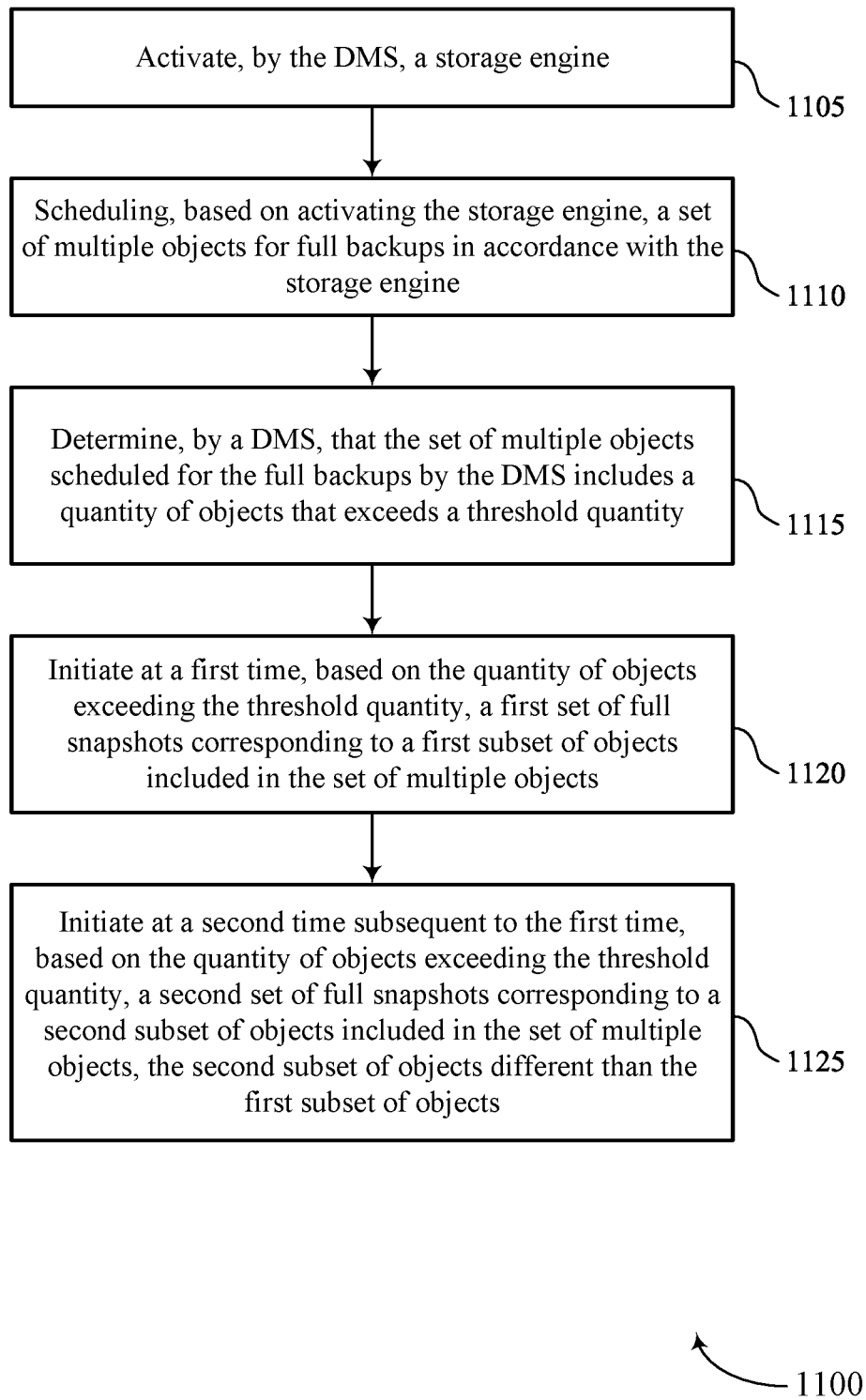

FIG. 11 illustrates a flowchart showing a method 1100 that supports obtaining full snapshots for subsets of objects over time in accordance with aspects of the present disclosure. The operations of the method 1100 may be implemented by a DMS or its components as described herein. For example, the operations of the method 1100 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 1105, the method may include activating, by the DMS, a storage engine. The operations of 1105 may be performed in accordance with examples as disclosed herein. In some examples, aspects of the operations of 1105 may be performed by a storage engine manager 655 as described with reference to FIG. 6.

At 1110, the method may include scheduling, based on activating the storage engine, a set of multiple objects for full backups in accordance with the storage engine. The operations of 1110 may be performed in accordance with examples as disclosed herein. In some examples, aspects of the operations of 1110 may be performed by a full backup component 625 as described with reference to FIG. 6.

At 1115, the method may include determining, by a DMS, that the set of multiple objects scheduled for full backups by the DMS includes a quantity of objects that exceeds a threshold quantity. The operations of 1115 may be performed in accordance with examples as disclosed herein. In some examples, aspects of the operations of 1115 may be performed by a full backup component 625 as described with reference to FIG. 6.

At 1120, the method may include initiating at a first time, based on the quantity of objects exceeding the threshold quantity, a first set of full snapshots corresponding to a first subset of objects included in the set of multiple objects. The operations of 1120 may be performed in accordance with examples as disclosed herein. In some examples, aspects of the operations of 1120 may be performed by a full snapshot component 630 as described with reference to FIG. 6.

At 1125, the method may include initiating at a second time subsequent to the first time, based on the quantity of objects exceeding the threshold quantity, a second set of full snapshots corresponding to a second subset of objects included in the set of multiple objects, the second subset of objects different than the first subset of objects. The operations of 1125 may be performed in accordance with examples as disclosed herein. In some examples, aspects of the operations of 1125 may be performed by a full snapshot component 630 as described with reference to FIG. 6.

A method is described. The method may include determining, by a DMS, that a set of multiple objects scheduled for full backups by the DMS includes a quantity of objects that exceeds a threshold quantity, initiating at a first time, based on the quantity of objects exceeding the threshold quantity, a first set of full snapshots corresponding to a first subset of objects included in the set of multiple objects, and initiating at a second time subsequent to the first time, based on the quantity of objects exceeding the threshold quantity, a second set of full snapshots corresponding to a second subset of objects included in the set of multiple objects, the second subset of objects different than the first subset of objects.

An apparatus is described. The apparatus may include a processor, memory coupled with the processor, and instructions stored in the memory. The instructions may be executable by the processor to cause the apparatus to determine, by a DMS, that a set of multiple objects scheduled for full backups by the DMS includes a quantity of objects that exceeds a threshold quantity, initiate at a first time, based on the quantity of objects exceeding the threshold quantity, a first set of full snapshots corresponding to a first subset of objects included in the set of multiple objects, and initiate at a second time subsequent to the first time, based on the quantity of objects exceeding the threshold quantity, a second set of full snapshots corresponding to a second subset of objects included in the set of multiple objects, the second subset of objects different than the first subset of objects.

Another apparatus is described. The apparatus may include means for determining, by a DMS, that a set of multiple objects scheduled for full backups by the DMS includes a quantity of objects that exceeds a threshold quantity, means for initiating at a first time, based on the quantity of objects exceeding the threshold quantity, a first set of full snapshots corresponding to a first subset of objects included in the set of multiple objects, and means for initiating at a second time subsequent to the first time, based on the quantity of objects exceeding the threshold quantity, a second set of full snapshots corresponding to a second subset of objects included in the set of multiple objects, the second subset of objects different than the first subset of objects.

A non-transitory computer-readable medium storing code is described. The code may include instructions executable by a processor to determine, by a DMS, that a set of multiple objects scheduled for full backups by the DMS includes a quantity of objects that exceeds a threshold quantity, initiate at a first time, based on the quantity of objects exceeding the threshold quantity, a first set of full snapshots corresponding to a first subset of objects included in the set of multiple objects, and initiate at a second time subsequent to the first time, based on the quantity of objects exceeding the threshold quantity, a second set of full snapshots corresponding to a second subset of objects included in the set of multiple objects, the second subset of objects different than the first subset of objects.

Some examples of the method, apparatuses, and non-transitory computer-readable medium described herein may further include operations, features, means, or instructions for determining, for inclusion in the first subset of objects, a first quantity of objects corresponding to a percentage of the set of multiple objects.

Some examples of the method, apparatuses, and non-transitory computer-readable medium described herein may further include operations, features, means, or instructions for receiving an indication of the percentage.

In some examples of the method, apparatuses, and non-transitory computer-readable medium described herein, the second subset of objects includes a second quantity of objects that may be equal to the first quantity based on the percentage.

Some examples of the method, apparatuses, and non-transitory computer-readable medium described herein may further include operations, features, means, or instructions for receiving a second indication of a second percentage of the set of multiple objects, where the second subset of objects includes a second quantity of objects that corresponds to the second percentage.

Some examples of the method, apparatuses, and non-transitory computer-readable medium described herein may further include operations, features, means, or instructions for monitoring, after initiating the first set of full snapshots corresponding to the first subset of objects, a status of the first set of full snapshots, where the status corresponds to a percentage of full snapshots of the first set of full snapshots that may be pending, a percentage of full snapshots of the first set of full snapshots that may have been obtained by the DMS, or both and determining, for inclusion in the second subset of objects, a second quantity of objects based on the status of the first set of full snapshots.

Some examples of the method, apparatuses, and non-transitory computer-readable medium described herein may further include operations, features, means, or instructions for transmitting a report that indicates the status of the first set of full snapshots based on the monitoring and receiving, in response to the report, an indication of the second quantity based on the status.

Some examples of the method, apparatuses, and non-transitory computer-readable medium described herein may further include operations, features, means, or instructions for monitoring, after initiating the second set of full snapshots corresponding to the second subset of objects, a second status of the second set of full snapshots, where the second status indicates a percentage of full snapshots of the second set of full snapshots that may be pending, a percentage of full snapshots of the second set of full snapshots that may have been obtained by the DMS, or both, determining a third quantity of a third subset of objects based on the status of the first set of full snapshots and the second status of the second set of full snapshots, and initiating, at a third time subsequent to the second time, based on the quantity of objects exceeding the threshold quantity, a third set of full snapshots corresponding to the third subset of objects included in the set of multiple objects, the third subset of objects different from the first subset of objects and the second subset of objects.

Some examples of the method, apparatuses, and non-transitory computer-readable medium described herein may further include operations, features, means, or instructions for determining a quantity of backup jobs being executed by the DMS within a time period prior to the second time and determining, for inclusion in the second subset of objects, a second quantity of objects based on the quantity of jobs being executed by the DMS.

Some examples of the method, apparatuses, and non-transitory computer-readable medium described herein may further include operations, features, means, or instructions for detecting a trigger condition associated with the DMS and delaying initiation of the second set of full snapshots based on detecting the trigger condition, where a time period between the first time and the second time may be increased based on delaying the second time.

Some examples of the method, apparatuses, and non-transitory computer-readable medium described herein may further include operations, features, means, or instructions for selecting objects from among the set of multiple objects to include in the first subset of objects based on first values of first unique IDs associated with the first subset of objects and selecting objects from among the set of multiple objects to include in the second subset of objects based on second values of second unique IDs associated with the second subset of objects.

Some examples of the method, apparatuses, and non-transitory computer-readable medium described herein may further include operations, features, means, or instructions for determining a first range of unique ID values based on a first target size of the first subset of objects and a target time period for obtaining the full backups of the set of multiple objects, where the first subset of objects may be based on the first values of the first unique IDs associated with the first subset of objects being within the first range and determining a second range of unique ID values based on a second target size of the second subset of objects and the target time period, where the second subset of objects may be based on the second values of the second unique IDs associated with the second subset of objects being within the second range.

Some examples of the method, apparatuses, and non-transitory computer-readable medium described herein may further include operations, features, means, or instructions for activating, by the DMS, a storage engine and scheduling, based on activating the storage engine, the set of multiple objects for the full backups in accordance with the storage engine.

In some examples of the method, apparatuses, and non-transitory computer-readable medium described herein, obtaining, by the DMS and using a second storage engine before activating the storage engine, second full snapshots corresponding to the set of multiple objects, where a second format of the second full snapshots obtained using the second storage engine may be different than a first format of full snapshots obtained using the storage engine.

Some examples of the method, apparatuses, and non-transitory computer-readable medium described herein may further include operations, features, means, or instructions for obtaining the first set of full snapshots, the second set of full snapshots, and other sets of full snapshots corresponding to other subsets of objects included in set of multiple objects and initiating, in response to obtaining full snapshots corresponding to all of the set of multiple objects using the storage engine, incremental snapshots corresponding to the set of multiple objects using the storage engine.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
   activating, by a data management system, a first storage engine;
   scheduling, by the data management system, a plurality of objects for full backups by the data management system based at least in part on activating the first storage engine, wherein scheduling the plurality of objects for full backups is further based at least in part on the first storage engine being associated with a first snapshot format that is incompatible with a second snapshot format associated with a previously activated second storage engine;
   acquiring, by the data management system, a first set of full snapshots of a first batch of objects from among the plurality of objects, wherein acquisition of the first set of full snapshots is initiated at a first time based at least in part on the plurality of objects exceeding a threshold quantity as of a time of the scheduling of the plurality of objects for full backups; and
   acquiring, by the data management system, a second set of full snapshots of a second batch of objects from among the plurality of objects, the second batch of objects different than and exclusive of the first batch of objects, wherein acquisition of the second set of full snapshots is initiated at a second time subsequent to the first time based at least in part on the plurality of objects exceeding the threshold quantity as of the time of the scheduling of the plurality of objects for full backups.

2. The method of claim 1, further comprising:
   determining, by the data management system and for inclusion in the first batch of objects, a first quantity of objects corresponding to a percentage of the plurality of objects.

3. The method of claim 2, further comprising:
   receiving an indication of the percentage.

4. The method of claim 2, wherein the second batch of objects comprises a second quantity of objects that is equal to the first quantity based at least in part on the percentage.

5. The method of claim 2, further comprising:
   receiving a second indication of a second percentage of the plurality of objects, wherein the second batch of objects comprises a second quantity of objects that corresponds to the second percentage.

6. The method of claim 1, further comprising:
   monitoring, by the data management system and after initiating the acquisition of the first set of full snapshots corresponding to the first batch of objects, a status of the first set of full snapshots, wherein the status corresponds to a percentage of full snapshots of the first set of full snapshots that are pending, a percentage of full snapshots of the first set of full snapshots that have been obtained by the data management system, or both; and
   determining, by the data management system and for inclusion in the second batch of objects, a quantity of objects based at least in part on the status of the first set of full snapshots.

7. The method of claim 6, further comprising:
   transmitting a report that indicates the status of the first set of full snapshots based at least in part on the monitoring; and
   receiving, in response to the report, an indication of the quantity of objects included in the second batch of objects based at least in part on the status.

8. The method of claim 6, further comprising:
   monitoring, by the data management system and after initiating the acquisition of the second set of full snapshots corresponding to the second batch of objects, a second status of the second set of full snapshots, wherein the second status indicates a percentage of full snapshots of the second set of full snapshots that are pending, a percentage of full snapshots of the second set of full snapshots that have been obtained by the data management system, or both;
   determining, by the data management system, a third quantity of a third batch of objects from among the plurality of objects based at least in part on the status of the first set of full snapshots and the second status of the second set of full snapshots; and
   acquiring, by the data management system, a third set of full snapshots corresponding to the third batch of objects included in the plurality of objects, the third batch of objects different from and exclusive of the first batch of objects and the second batch of objects, wherein acquisition of the third set of full snapshots is initiated at a third time subsequent to the second time based at least in part on the plurality of objects exceeding the threshold quantity as of the time of the scheduling of the plurality of objects for full backups.

9. The method of claim 1, further comprising:
   determining, by the data management system, a quantity of backup jobs being executed by the data management system within a time period prior to the second time; and determining, by the data management system and for inclusion in the second batch of objects, a quantity of objects based at least in part on the quantity of jobs being executed by the data management system.

10. The method of claim 1, further comprising:
detecting a trigger condition associated with the data management system; and
delaying initiation of the acquisition of the second set of full snapshots based at least in part on detecting the trigger condition, wherein a time period between the first time and the second time is increased based at least in part on delaying the second time.

11. The method of claim 1, further comprising:
selecting objects from among the plurality of objects to include in the first batch of objects based at least in part on first values of first unique identifiers associated with the first batch of objects; and
selecting objects from among the plurality of objects to include in the second batch of objects based at least in part on second values of second unique identifiers associated with the second batch of objects.

12. The method of claim 11, further comprising:
determining a first range of unique identifier values based at least in part on a first target size of the first batch of objects and a target time period for obtaining the full backups of the plurality of objects, wherein the first batch of objects is based at least in part on the first values of the first unique identifiers associated with the first batch of objects being within the first range; and
determining a second range of unique identifier values based at least in part on a second target size of the second batch of objects and the target time period, wherein the second batch of objects is based at least in part on the second values of the second unique identifiers associated with the second batch of objects being within the second range.

13. The method of claim 1, further comprising:
obtaining, by the data management system and using a second storage engine before activating the first storage engine, second full snapshots corresponding to the plurality of objects, wherein the second full snapshots have the second snapshot format, and wherein the second storage engine is the previously activated second storage engine.

14. The method of claim 1, further comprising:
obtaining the first set of full snapshots, the second set of full snapshots, and other sets of full snapshots corresponding to other batches of objects included in the plurality of objects; and
acquiring, in response to obtaining full snapshots corresponding to all of the plurality of objects using the first storage engine, incremental snapshots corresponding to the plurality of objects using the first storage engine.

15. An apparatus, comprising:
at least one processor;
memory coupled with the at least one processor; and
instructions stored in the memory and executable by the at least one processor to cause the apparatus to:
activate, by a data management system, a first storage engine;
schedule, by the data management system, a plurality of objects for full backups by the data management system based at least in part on activating the first storage engine, wherein scheduling the plurality of objects for full backups is further based at least in part on the first storage engine being associated with a first snapshot format that is incompatible with a second snapshot format associated with a previously activated second storage engine;
acquire, by the data management system, a first set of full snapshots of a first batch of objects from among the plurality of objects, wherein acquisition of the first set of full snapshots is initiated at a first time based at least in part on the plurality of objects exceeding a threshold quantity as of a time of the scheduling of the plurality of objects for full backups; and
acquire, by the data management system, a second set of full snapshots of a second batch of objects from among the plurality of objects, the second batch of objects different than and exclusive of the first batch of objects, wherein acquisition of the second set of full snapshots is initiated at a second time subsequent to the first time based at least in part on the plurality of objects exceeding the threshold quantity as of the time of the scheduling of the plurality of objects for full backups.

16. The apparatus of claim 15, wherein the instructions are further executable by the at least one processor to cause the apparatus to:
determine, by the data management system and for inclusion in the first batch of objects, a first quantity of objects corresponding to a percentage of the plurality of objects.

17. The apparatus of claim 15, wherein the instructions are further executable by the at least one processor to cause the apparatus to:
monitor, by the data management system and after initiating the acquisition of the first set of full snapshots corresponding to the first batch of objects, a status of the first set of full snapshots, wherein the status corresponds to a percentage of full snapshots of the first set of full snapshots that are pending, a percentage of full snapshots of the first set of full snapshots that have been obtained by the data management system, or both; and
determine, by the data management system and for inclusion in the second batch of objects, a quantity of objects based at least in part on the status of the first set of full snapshots.

18. A non-transitory computer-readable medium storing code, the code comprising instructions executable by at least one processor to:
activate, by a data management system, a first storage engine;
schedule, by the data management system, a plurality of objects for full backups by the data management system based at least in part on activating the first storage engine, wherein scheduling the plurality of objects for full backups is further based at least in part on the first storage engine being associated with a first snapshot format that is incompatible with a second snapshot format associated with a previously activated second storage engine;
acquire, by the data management system, a first set of full snapshots of a first batch of objects from among the plurality of objects, wherein acquisition of the first set of full snapshots is initiated at a first time based at least in part on the plurality of objects exceeding a threshold quantity as of a time of the scheduling of the plurality of objects for full backups; and
acquire, by the data management system, a second set of full snapshots of a second batch of objects from among the plurality of objects, the second batch of objects different than and exclusive of the first batch of objects, wherein acquisition of the second set of full snapshots is initiated at a second time subsequent to the first time based at least in part on the plurality of objects exceeding the threshold quantity as of the time of the scheduling of the plurality of objects for full backups.

19. The non-transitory computer-readable medium of claim 18, wherein the instructions are further executable by the at least one processor to:
   determine, by the data management system and for inclusion in the first batch of objects, a first quantity of objects corresponding to a percentage of the plurality of objects.

20. The apparatus of claim 15, wherein the instructions are further executable by the at least one processor to cause the apparatus to:
   obtain, by the data management system and using a second storage engine before activating the first storage engine, second full snapshots corresponding to the plurality of objects, wherein the second full snapshots have the second snapshot format, and wherein the second storage engine is the previously activated second storage engine.

* * * * *